US011022829B2

(12) United States Patent
Ishida et al.

(10) Patent No.: US 11,022,829 B2
(45) Date of Patent: Jun. 1, 2021

(54) IMAGE DISPLAY DEVICE

(71) Applicant: PANASONIC INTELLECTUAL PROPERTY MANAGEMENT CO., LTD., Osaka (JP)

(72) Inventors: Shinya Ishida, Osaka (JP); Akihiro Fujikawa, Nara (JP); Toshiyuki Enoki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 14 days.

(21) Appl. No.: 16/492,593

(22) PCT Filed: Nov. 7, 2018

(86) PCT No.: PCT/JP2018/041346
§ 371 (c)(1),
(2) Date: Sep. 9, 2019

(87) PCT Pub. No.: WO2019/123871
PCT Pub. Date: Jun. 27, 2019

(65) Prior Publication Data
US 2020/0409204 A1 Dec. 31, 2020

(30) Foreign Application Priority Data

Dec. 19, 2017 (JP) .............................. JP2017-242480

(51) Int. Cl.
*G02F 1/1333* (2006.01)
(52) U.S. Cl.
CPC .... *G02F 1/133308* (2013.01); *G02F 1/13332* (2021.01); *G02F 1/133314* (2021.01); *G02F 1/133317* (2021.01)

(58) Field of Classification Search
CPC ... G02F 1/133308; G02F 2001/133314; G02F 2001/133317; G02F 2001/13332; G09G 3/3406; G09G 3/36; G06F 2203/04103
See application file for complete search history.

(56) References Cited

U.S. PATENT DOCUMENTS 7,738,245 B1 * 6/2010 Stifal .................... G06F 1/1601
361/679.21
2005/0243106 A1 11/2005 Bae et al.
(Continued)

FOREIGN PATENT DOCUMENTS

JP 2008-009164 A 1/2008
JP 5369593 B2 12/2013

OTHER PUBLICATIONS

International Search Report and Written Opinion dated Jan. 22, 2019 in International Application No. PCT/JP2018/041346; with partial English translation.
(Continued)

*Primary Examiner* — Robert J Michaud
(74) *Attorney, Agent, or Firm* — McDermott Will and Emery LLP

(57) ABSTRACT

An image display device includes: a display unit having a display panel and a support member supporting the display panel; a plurality of attaching members arranged on the support member; and a base plate opposing a back surface of the support member. The base plate includes a first opening part and a second opening part. The first opening part has an opening through which a fastening member passes, the fastening member fastening the base plate with a first attaching member. The second opening part has an opening into which a protruding part is inserted, the protruding part being provided to a second attaching member,
(Continued)

the opening is larger than the protruding part as viewed from a protruding direction of the protruding part.

15 Claims, 18 Drawing Sheets

(56) References Cited

U.S. PATENT DOCUMENTS

| | | | | |
|---|---|---|---|---|
| 2010/0065695 A1* | 3/2010 | Fujikawa | ............... | F16M 11/22 |
| | | | | 248/121 |
| 2012/0268449 A1* | 10/2012 | Choi | ................... | H05K 5/0234 |
| | | | | 345/214 |
| 2015/0237291 A1 | 8/2015 | Ohki et al. | | |
| 2016/0272073 A1* | 9/2016 | Hosaka | .................. | H02M 7/44 |
| 2019/0141848 A1* | 5/2019 | Sung | .................... | G06F 1/1601 |

OTHER PUBLICATIONS

An Extended European Search Report dated Dec. 23, 2020 issued in the corresponding European Patent Application No. 18892485.6.

* cited by examiner

IMAGE DISPLAY DEVICE

CROSS-REFERENCE OF RELATED APPLICATIONS

This application is the U.S. National Phase under 35 U.S.C. § 371 of International Patent Application No. PCT/JP2018/041346, filed on Nov. 7, 2018, which in turn claims the benefit of Japanese Application No. 2017-242480, filed on Dec. 19, 2017, the entire disclosures of which applications are incorporated by reference herein.

TECHNICAL FIELD

The present disclosure relates to an image display device including a display panel for displaying images.

BACKGROUND ART

PTL 1 discloses an image display device including a panel for displaying images, a chassis supporting the panel in the front, a plurality of circuit boards fixed on the back surface of the chassis, and a front cover and a back cover, which house these components inside.

CITATION LIST

Patent Literature

PTL 1: Japanese Unexamined Patent Application Publication No. 2008-9164

SUMMARY OF THE INVENTION

Technical Problem

The present disclosure provides an image display device which enables thickness reduction and has an advantageous structure.

Solution to Problem

An image display device according to the present disclosure includes: a display unit including a display panel that displays an image on a front surface of the display panel, and a support member opposing a back surface of the display panel and supporting the display panel; a plurality of attaching members on the support member; and a base plate opposing a back surface of the support member, wherein the base plate includes: a first opening part including an opening through which a fastening member passes, the fastening member fastening the base plate with a first attaching member that is one of the plurality of attaching members; and a second opening part including an opening into which a protruding part is inserted, the protruding part being provided to a second attaching member that is another one of the plurality of attaching members, the opening of the second opening part being larger than the protruding part as viewed from a protruding direction of the protruding part.

Advantageous Effects of Invention

According to the present disclosure, it is possible to provide an image display device which enables thickness reduction and has an advantageous structure.

DESCRIPTION OF EXEMPLARY EMBODIMENTS

Figure 1:
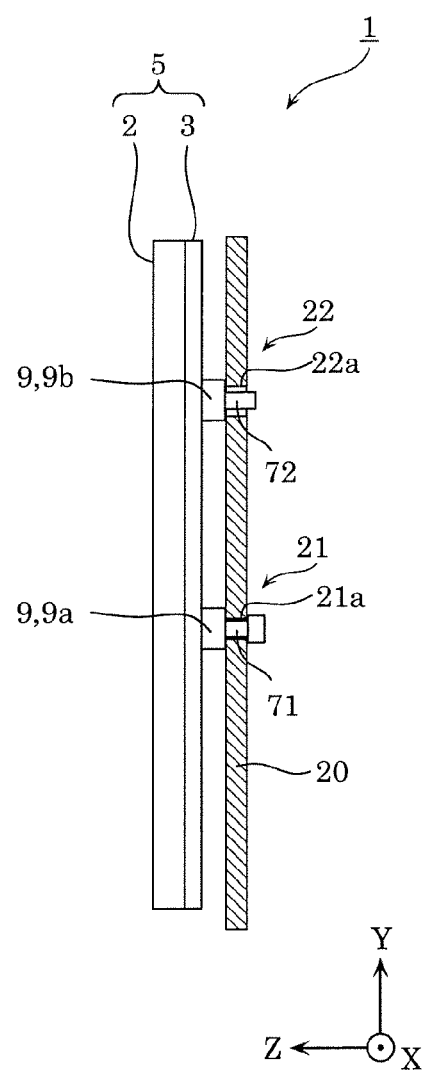
FIG. 1 is a side view showing a basic configuration of an image display device according to the present disclosure.

The inventors of the present invention have found that the following problems occur in a conventional image display device. Conventionally, an image display device such as a liquid crystal television receiver has been provided with a bezel which covers the outer periphery of a display panel, which is, for example, a liquid crystal panel. As a bezel included in the image display device, for example, a rectangular-annular member like a front cover in PTL 1 described above is adopted.

However, in recent years, there has been a demand for thickness reduction of an image display device, and in order to meet such a requirement, the present inventors have studied on a structure of an image display device which has no frame member surrounding the periphery of the display panel.

Specifically, when no frame member is arranged in the image display device, since the display panel cannot be supported from the outer periphery, for example, a structure in which the display panel is supported from a back side is adopted. That is, a display unit is configured by arranging, for example, a metal plate opposing a back surface of the display panel, and, for example, a stand (which may be a wall-hanging unit, the same applies hereinafter) is directly or indirectly fixed to the metal plate. That is, the stand is fastened to the metal plate, which forms a back of the display unit, with a plurality of screws. Thus, an image display device having a structure in which the periphery of the display panel is not surrounded by a frame is realized.

However, in this case, since the metal plate opposing the back surface of the display panel is exposed to the outside, for example, an insulation problem or an appearance problem for the metal plate may occur. Therefore, it is conceivable to provide, for example, a glass plate instead of a metal plate opposing the back surface of the display panel, that is, to form the back of the display unit with a glass plate. However, in this case, a problem arises in that it is not realistic to fix a stand or the like to the glass plate with a screw.

Further, for example, by supporting the display panel with a frame member attached to the peripheral edge of the back surface of the display panel, it is possible to realize an image display device having a structure in which the periphery of the display panel is not surrounded by a frame. However, in this case, the frame member is supported, for example, on a base plate, which opposes a back surface of the frame member, with a plurality of points (such as screws). Therefore, in order to support the display unit including the frame member securely and safely, what kind of support structure should be adopted is a problem.

The present disclosure has been made based on such findings, and as a result of intensive studies by the present inventors, they have obtained an idea about a structure of an image display device that enables thickness reduction and has an advantageous structure.

Hereinafter, certain exemplary embodiments are described in greater detail with reference to the accompanying Drawings. However, unnecessarily detailed description may be omitted. For example, detailed explanation of a well-known matter and repeated description of substantially identical structures may be omitted. Such omission makes the following description exclude unnecessary redundancy and be easily understood by those skilled in the art. Furthermore, the Drawings include a schematic diagram in which emphasis, omission, or ratio adjustment is made, if necessary, to allow the configuration of the image display device according to the present disclosure easily understood. Therefore, such a drawing shows a shape, position relationship, or ratio different from actual one.

It should also be noted that the following embodiments and claims may include expressions indicating orientations, positions, or the like regarding one or more objects, such as "parallel" or "center". However, such expressions sometimes do not literally mean the orientations, positions, or the like. For example, "parallel" sometimes does not mean completely parallel but means substantially parallel. In other words, "parallel" includes a difference of about several % from completely parallel. The same is applied to other expressions, such as "same" or "equal", indicating a relationship between two or more information items or objects.

It should be noted that the inventors of the present application provide the accompanied drawings and the following description to allow those skilled in the art to well understand the present disclosure without intending to limit the subject according to the appended claims to the drawings and description.

Further, in the following embodiments, for convenience of explanation, an up-down direction is a Y-axis, a front-back direction is a Z-axis, and a left-right direction (horizontal direction) is an X-axis. These correspondences, however, do not limit a posture at the time of manufacture or usage of the image display device according to the present disclosure. In the following description, for example, an X-axis plus side indicates the side of an arrow direction of the X-axis, and an X-axis minus side indicates the side of a direction opposite to the X-axis plus direction. The same applies to the Y-axis and the Z-axis.

(Basic Configuration of Image Display Device According to Present Disclosure)

First, a basic configuration of an image display device according to the present disclosure will be described with reference to FIG. 1. FIG. 1 is a side view showing a basic configuration of image display device 1 according to the present disclosure. Note that FIG. 1 schematically shows the basic configuration of image display device 1, and base plate 20 shows a cross section in a Y-Z plane passing through a plurality of attaching members 9. Further, in FIG. 1, the surface on a left side (Z-axis plus side) of display panel 2 is a front surface (surface on which an image is displayed) of display panel 2, and the direction on the Y-axis plus side is vertically upward.

Image display device 1 shown in FIG. 1 is an image display device having a configuration common to image display device 10 according to Embodiment 1 described below and image display device 30 according to Embodiment 2 described below. Specifically, as shown in FIG. 1, image display device 1 according to the present embodiment includes: display unit 5 having display panel 2 that displays an image on the front surface of display panel 2, and support member 3 opposing a back surface of display panel 2 and supporting display panel 2; a plurality of attaching members 9 arranged on support member 3; and base plate 20 opposing a back surface of support member 3. Base plate 20 has first opening part 21 and second opening part 22. First opening part 21 has opening 21a through which fastening member 71 passes, fastening member 71 fastening base plate 20 with first attaching member 9a which is one of the plurality of attaching members 9. Second opening part 22 has opening 22a into which protruding part 72 is inserted, protruding part 72 being provided on second attaching member 9b, which is one of the plurality of attaching members 9, opening 22a being larger than protruding part 72 as viewed from a protruding direction of protruding part 72.

According to this configuration, since display panel 2 is supported from the back side, a frame member for supporting display panel 2 from an outer periphery in a front view is unnecessary. Therefore, at least a thickness of a peripheral edge part of a portion for displaying an image in image display device 1 can be reduced. Further, display unit 5 is fixed to base plate 20 by first attaching member 9a arranged on support member 3. Further, since second attaching member 9b arranged on support member 3 is, in normal time, not in a state of receiving load of display unit 5, for example, strength deterioration of the portion where second attaching member 9b is provided to support member 3 is not likely to occur. Therefore, if second attaching member 9b falls into a state of receiving the load of display unit 5 upon occurrence of an abnormality such as that one or more of first attaching members 9a comes off from support member 3, second attaching member 9b can play a role as a member for supporting display unit 5.

As described above, image display device 1 according to the present embodiment is image display device 1 that enables thickness reduction and has an advantageous structure. Note that, although second attaching member 9b is located further upward than first attaching member 9a in FIG. 1, first attaching member 9a and second attaching member 9b may be located at the same position in the up-down direction, or first attaching member 9a may be located further upward than second attaching member 9b.

A more specific example of image display device 1 having the basic configuration described above will be described below as Embodiments 1 and 2.

Embodiment 1

First, Embodiment 1 will be described with reference to FIGS. 2A to 10. First, referring to FIGS. 2A to 4, a configuration outline of an image display device according to Embodiment 1 will be described.

[1-1. General Configuration of Image Display Device]

Figure 2A:
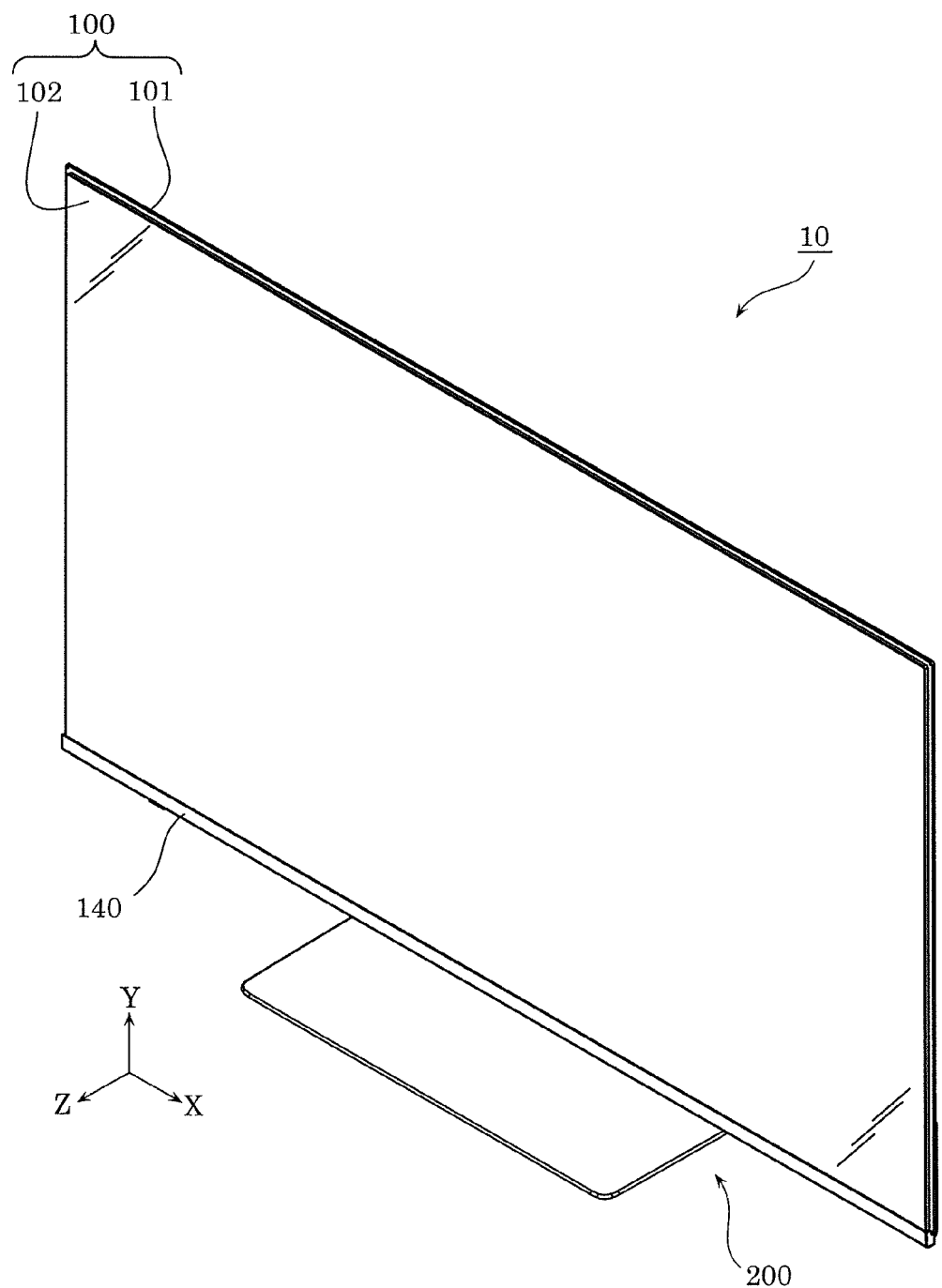
FIG. 2A is a perspective view showing a front side of an image display device according to Embodiment 1.
Figure 2B:
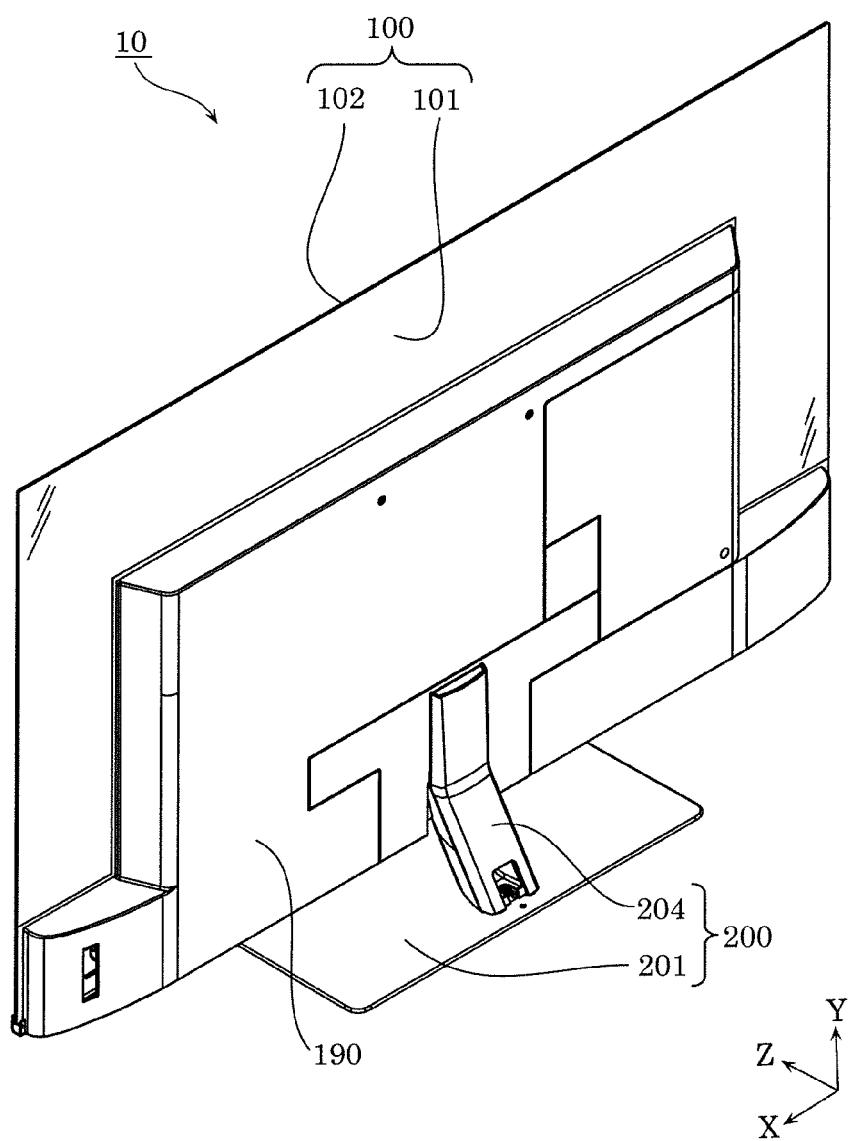
FIG. 2B is a perspective view showing a back side of the image display device according to Embodiment 1.
Figure 3:
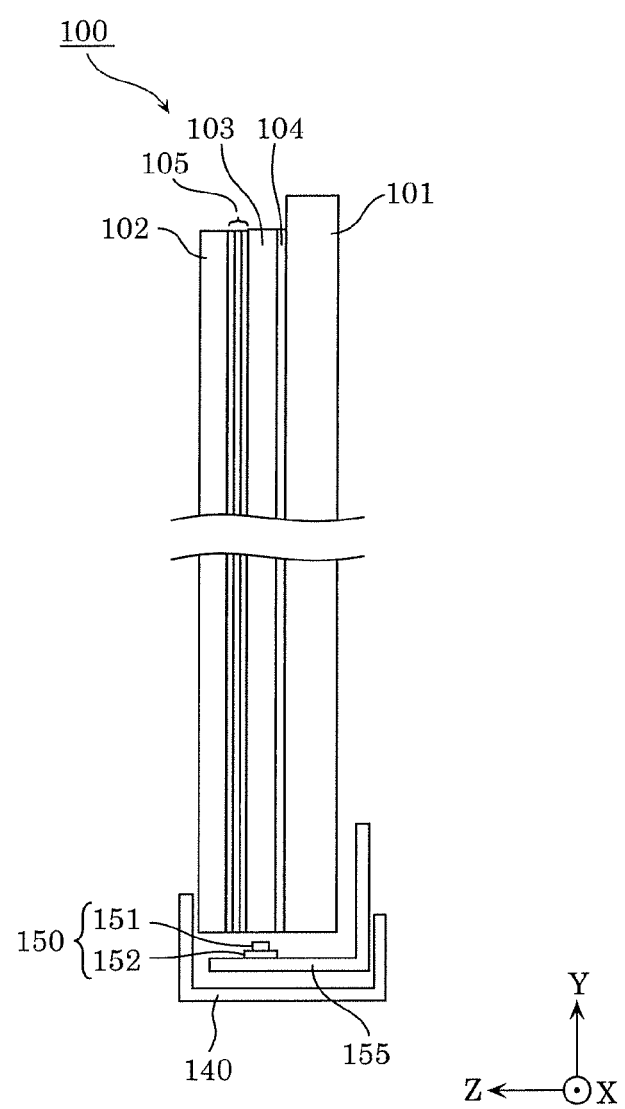
FIG. 3 is a side view showing a configuration outline of a display unit according to Embodiment 1.
Figure 4:
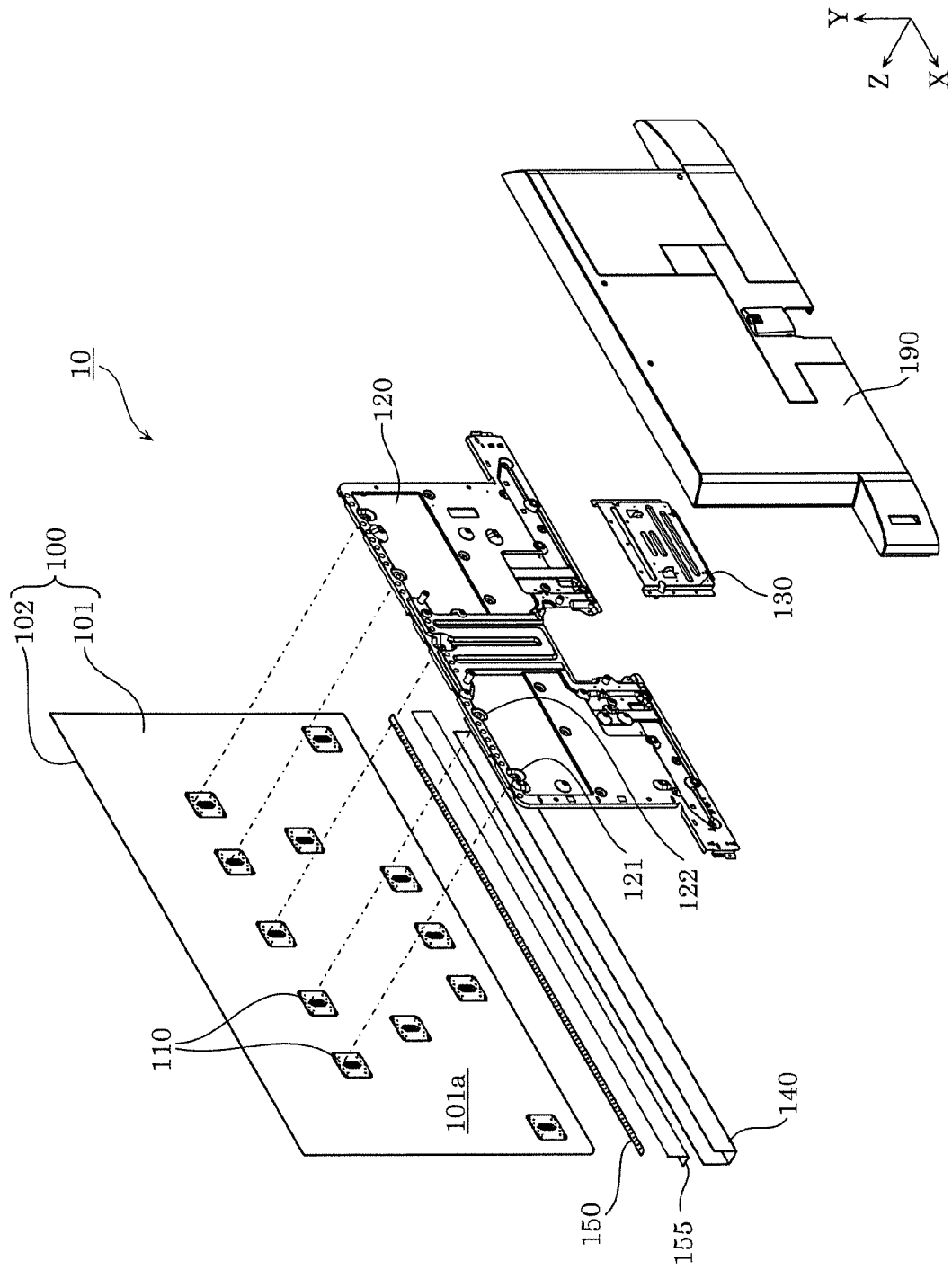
FIG. 4 is an exploded perspective view of the image display device according to Embodiment 1.

FIG. 2A is a perspective view showing a front side of image display device 10 according to Embodiment 1. FIG. 2B is a perspective view showing a back side of image display device 10 according to Embodiment 1. FIG. 3 is a side view showing a configuration outline of display unit 100 according to Embodiment 1. FIG. 4 is an exploded perspective view of image display device 10 according to Embodiment 1. In FIG. 4, illustration of various electronic circuits, wirings, and stand 200 and the like is omitted.

As shown in FIGS. 2A and 2B, image display device 10 is, for example, a liquid crystal television receiver of a flat panel display type. Image display device 10 includes display unit 100 and stand 200 that supports display unit 100. Display unit 100 includes display panel 102 for displaying an image on a front surface (surface on the Z axis plus side) of display panel 102 and support plate 101 opposing a back surface (Z axis minus side) of display panel 102 for supporting display panel 102. Support plate 101 is an example of a support member. Back cover 190 which is, for example, a resin molded product opposes a back surface of display unit 100. Back cover 190 covers only a part of the back surface of support plate 101 as shown in FIG. 2B, and other portions are exposed. Note that, although back cover 190 is constituted by a plurality of members, such as a main body and a lid plate, these members are regarded as back cover 190 in the present embodiment.

In the present embodiment, display panel 102 included in display unit 100 is a liquid crystal cell, and display unit 100 has, as shown in FIG. 3, optical sheet unit 105, light guide plate 103, and reflection plate 104 between display panel 102 and support plate 101. In addition, display panel 102, optical sheet unit 105, light guide plate 103, and reflection plate 104 are fixed to support plate 101 by an adhesive tape, an adhesive or the like arranged at the peripheral edge part. That is, display unit 100 constituted by display panel 102, optical sheet unit 105, light guide plate 103, reflection plate 104, and support plate 101 is handled as one structure in a assembling process of image display device 10.

Light emitting diode (LED) unit 150 which is an example of a light source part is arranged at a position opposed to a lower end surface of light guide plate 103 of display unit 100. The light emitted from LED unit 150 enters an inside of light guide plate 103 from the lower end surface of light guide plate 103, and enters display panel 102 through optical sheet unit 105 arranged on the front surface of light guide plate 103. Optical sheet unit 105 includes one or more optical sheets such as a diffusion sheet or a light condensing sheet. That is, in the present embodiment, light for image display is supplied to display panel 102, which is a liquid crystal cell, by an edge-light type backlight.

LED unit 150 has long-size substrate 152 which extends along the lower end surface of light guide plate 103, and a plurality of LED elements 151 which are arranged in line on an upper surface of long-size substrate 152. In LED unit 150 shown in FIG. 4, although the plurality of LED elements 151 are arranged on one substrate 152, LED unit 150 may be constituted by a plurality of substrates, which are arranged in line along the lower end surface of light guide plate 103, and each have one or more LED elements 151. That is, LED unit 150 may be constituted by a plurality of LED modules which are separate from one another.

Moreover, in the present embodiment, LED unit 150 is supported by light-source support member 155 from below. Light-source support member 155 is a metallic member, for example, an aluminum member and also functions as a heat radiation member (heat sink) for radiating heat generated from LED unit 150.

Further, in the present embodiment, as shown in FIGS. 2A and 3, bezel 140 which covers a lower end part of the front surface of display panel 102 is provided in image display device 10. More specifically, bezel 140 has a portion which covers the lower and part of the front surface of display panel 102 and a portion which is arranged below light-source support member 155. These bezel 140 and light-source support member 155 are fixed in image display device 10 by being directly or indirectly connected with base plate 120 to be described below.

Stand 200 is a leg part which makes image display device 10 stand by itself, and has plate-shaped stand base 201 and neck part 204 which is installed upright from stand base 201. Neck part 204 is mechanically connected with display unit 100, and thereby stand 200 is fixed to display unit 100.

Specifically, stand 200 is connected with base plate 120 via connecting member 130 as shown in FIG. 4. For example, neck part 204 is fastened to connecting member 130 with a plurality of screws, and connecting member 130 is fastened to base plate 120 with a plurality of screws. Further, display unit 100 is fixed to base plate 120, and thereby stand 200 and display unit 100 are mechanically connected with each other. Note that in the present embodiment, although stand 200 is exemplified as a member for installing image display device 10, image display device 10 may include, in place of stand 200, for example a wall-hanging unit for installing image display device 10 on a wall surface.

Here, in the present embodiment, support plate 101 for forming the back of display unit 100 is a glass plate, and when display unit 100 is seen from the back side as shown in FIG. 2B, an upper end part, and left and right end parts of support plate 101 are exposed from back cover 190. Therefore, when image display device 10 is observed from the outside, a peripheral edge part of a portion for displaying an image is recognized to be thinner, and glossy feeling peculiar to glass occurs in the back side. That is, the thickness of image display device 10 is reduced, and image display device 10 is given aesthetic appearance.

However, it is impossible or difficult to form a screw hole for fixing base plate 120 in support plate 101 which is a glass plate. Accordingly, in image display device 10 according to the present embodiment, a method is adopted, as shown in FIG. 4, in which a plurality of attaching members 110 are bonded to back surface 101a of support plate 101, and base plate 120 is fixed to support plate 101 via attaching members 110.

Further, base plate 120 has a plurality of first opening parts 121 and second opening parts 122 which are provided at positions opposed to a plurality of attaching members 110. Attaching member 110, of the plurality of attaching members 110, opposed to second opening part 122 plays a different role from that of attaching member 110 opposed to first opening part 121. Hereinafter, referring to FIGS. 5 to 10, configurations of attaching member 110 and its surroundings in image display device 10 according to the present embodiment will be described.

[1-2. Configurations of Attaching Member and its Surroundings]

Figure 5:
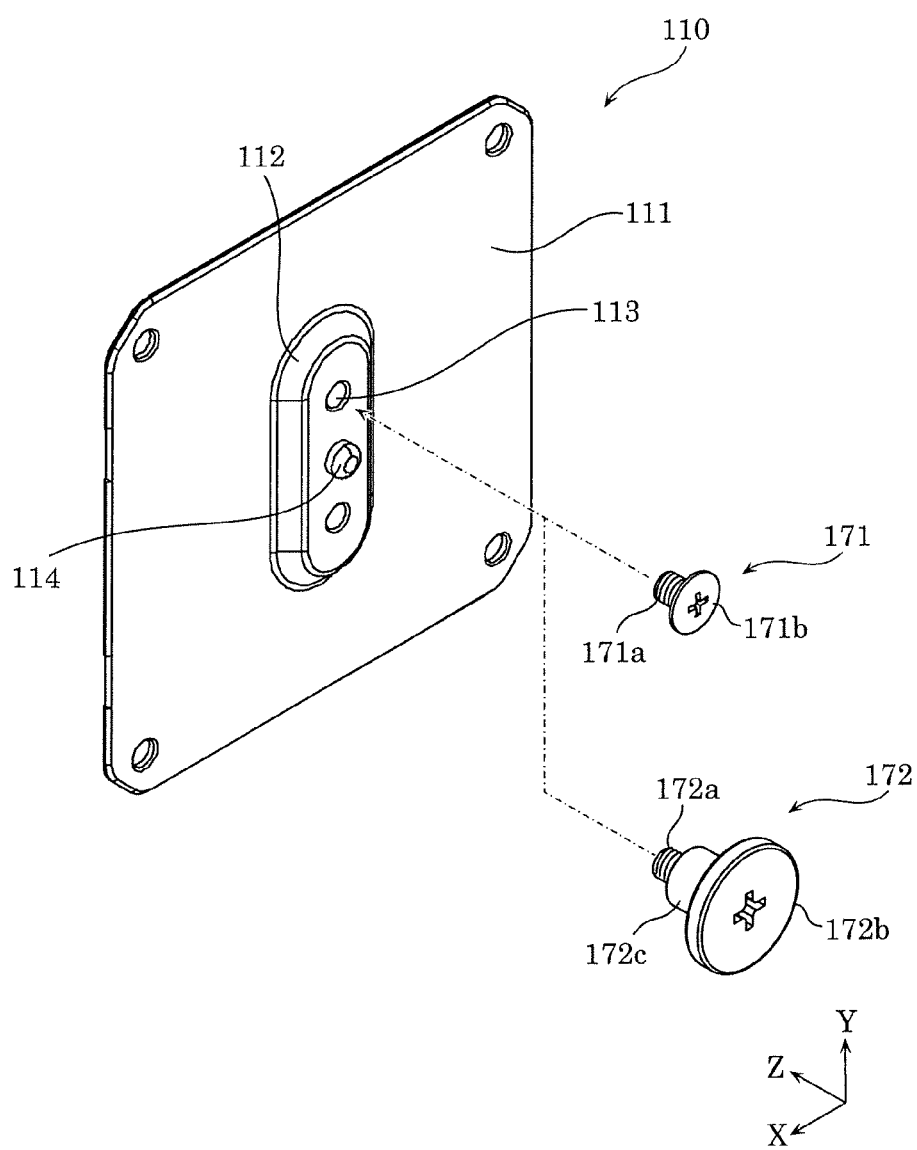
FIG. 5 is a perspective view showing a configuration of an attaching member according to Embodiment 1.
Figure 6:
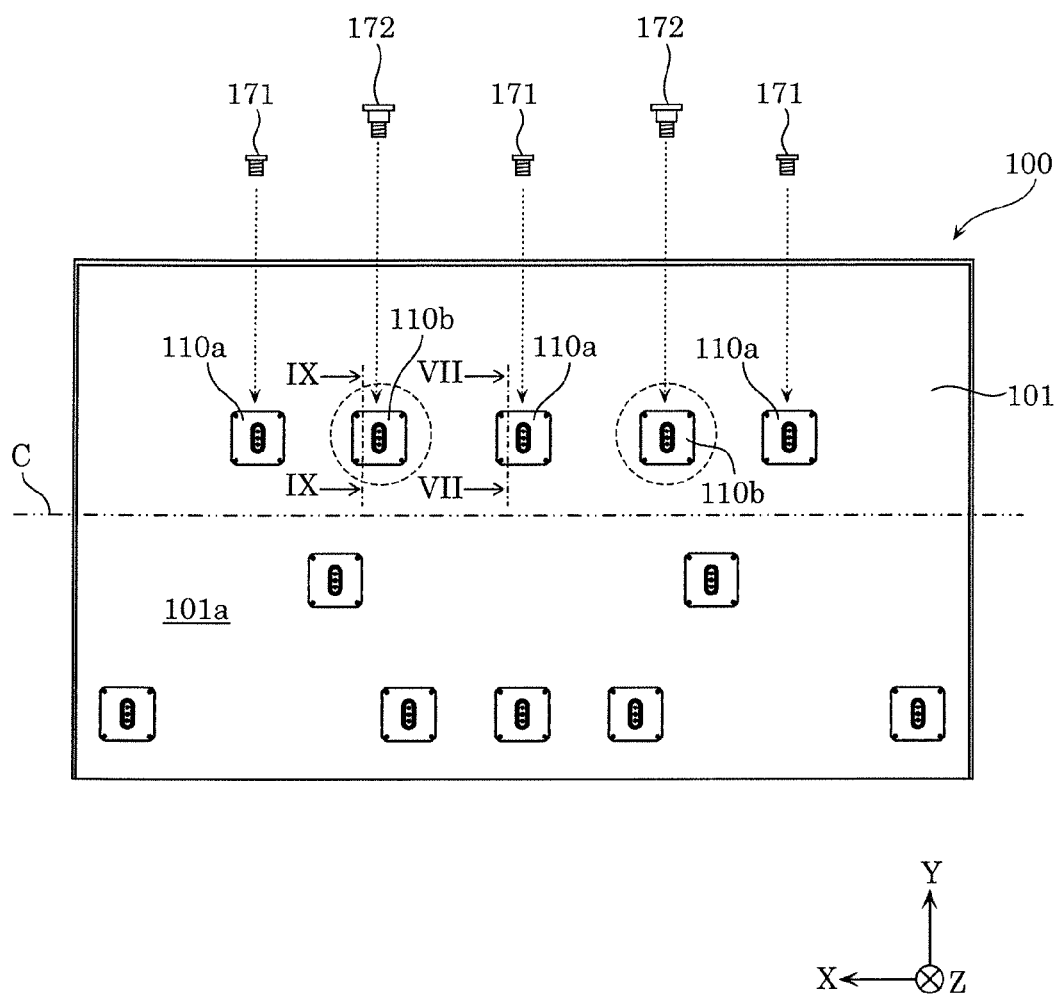
FIG. 6 is a diagram showing an example of an arrangement layout of a plurality of attaching members according to Embodiment 1.

FIG. 5 is a perspective view showing a configuration of attaching member 110 according to Embodiment 1. FIG. 6 is a diagram showing an example of an arrangement layout of a plurality of attaching members 110 according to Embodiment 1. Note that a two-dot chain line in parallel with the X-axis in FIG. 6 represents center line C which passes through a middle position in the up-down direction of display unit 100.

As shown in FIG. 5, attaching member 110 according to the present embodiment includes body part 111, boss 112 which is formed into a convex shape from main body part 111, screw hole 113 formed in boss 112, and convex part 114. Note that attaching member 110 is a member which is fabricated by subjecting a plate of metal such as aluminum or iron to press forming, etc.

Main body part 111 is a portion that forms a surface (surface of Z-axis plus side) to be bonded to back surface 101a of support plate 101. Note that although there is no particular limitation on the adhesive with which main body part 111 and back surface 101a of support plate 101 are bonded, for example, an adhesive which has a relatively high adhesive force and resistant to degradation due to a temperature cycle. Moreover, attaching member 110 according to the present embodiment may also be used for a case in which a member as a fixing target is not a glass plate, but a metal plate.

Boss 112 provided in a middle portion of main body part 111 has a level of height which allows housing of a tip end portion of a screw passing through screw hole 113. Convex part 114 provided in boss 112 is a portion which can be used for positioning a counterpart member (base plate 120 in the present embodiment) which is to be fastened with attaching member 110 with a screw.

First screw 171, which is a screw for fastening base plate 120 with attaching member 110, includes head part 171b and shaft part 171a. Second screw 172 is a screw which passes through base plate 120 and does not fasten base plate 120 with attaching member 110. Second screw 172 includes head part 172b, shaft part 172a, and step part 172c provided at a foot of shaft part 172a. That is, second screw 172 is, for example, a screw called as a "stepped screw".

In the present embodiment, both of shaft part 171a of first screw 171 and shaft part 172a of second screw 172 can be screwed into screw hole 113 of attaching member 110. That is, shaft part 171a of first screw 171 and shaft part 172a of second screw 172 are identical in outer diameter, pitch of screw thread, and the like.

In this way, which of two kinds of screws (171, 172) having different general shapes is to be used is determined according to the position of attaching member 110.

In the present embodiment, for example as shown in FIG. 6, second screw 172 is used for some of attaching members 110 of the plurality of attaching members 110, and first screw 171 is used for remaining attaching members 110.

Note that in the present embodiment, twelve attaching members 110 shown in FIG. 6 are a common part and identical in size and shape, however, attaching member 110 which is to be fastened with base plate 120 with first screw 171 is denoted as first attaching member 110a. Further, attaching member 110 to which second screw 172 is fixed is denoted as second attaching member 110b.

In the present embodiment, two attaching members 110 each surrounded by a dashed-line circle, of twelve attaching members 110 are second attaching members 110b, and remaining 10 attaching members 110 are first attaching members 110a (including those which are not given reference symbols). Second attaching members 110b are arranged further upward than the middle (center line C) in the up-down direction in display unit 100.

Each of first attaching member 110a and second attaching member 110b, which are distinguished from each other as described above, is different in a structural relationship with base plate 120. Then, a configuration of each of first attaching member 110a and second attaching member 110b will be described with reference to FIGS. 7 to 10.

Figure 7:
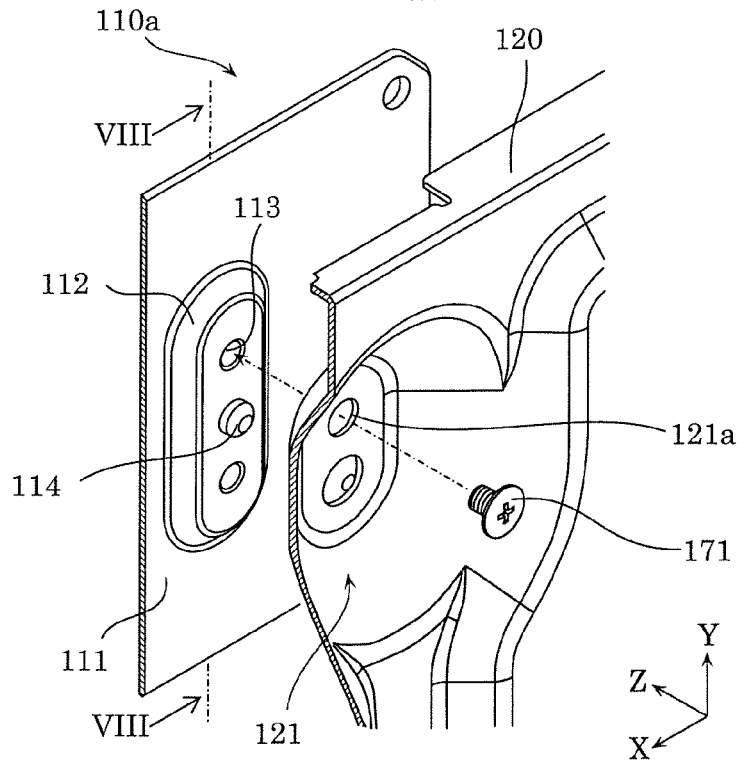
FIG. 7 is an enlarged perspective view separately showing a first attaching member and a first opening part, according to Embodiment 1.

FIG. 7 is an enlarged perspective view separately showing first attaching member 110a and first opening part 121 according to Embodiment 1. Note that FIG. 7 illustrates a state in which first attaching member 110a and base plate 120 are sectioned by a Y-Z plane passing line VII-VII in FIG. 6.

Figure 8:
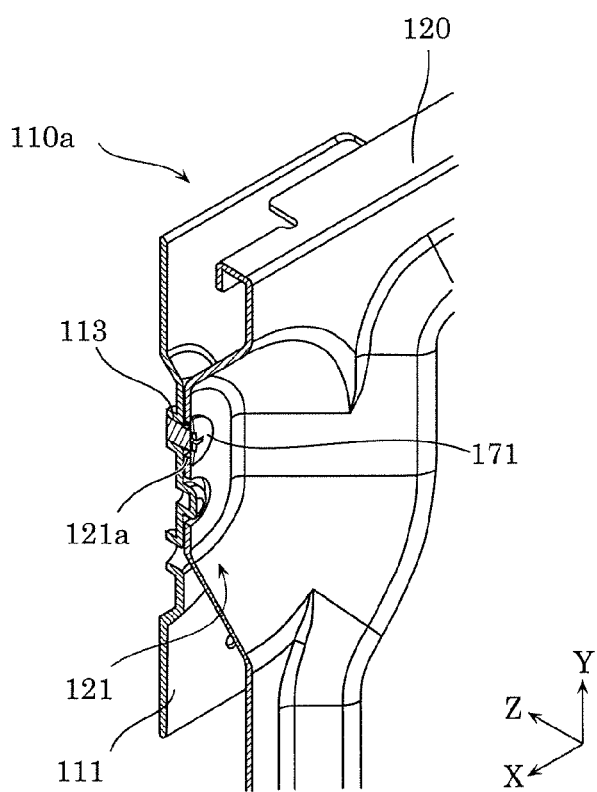
FIG. 8 is an enlarged perspective view showing a state in which the first attaching member and the first opening part according to Embodiment 1 are fastened by a first screw.

FIG. 8 is an enlarged perspective view showing a state in which first attaching member 110a and first opening part 121 according to Embodiment 1 are fastened by first screw 171. Note that FIG. 8 illustrates a state in which first attaching member 110a and base plate 120 are sectioned by a Y-Z plane passing line VIII-VIII in FIG. 7.

Figure 9:
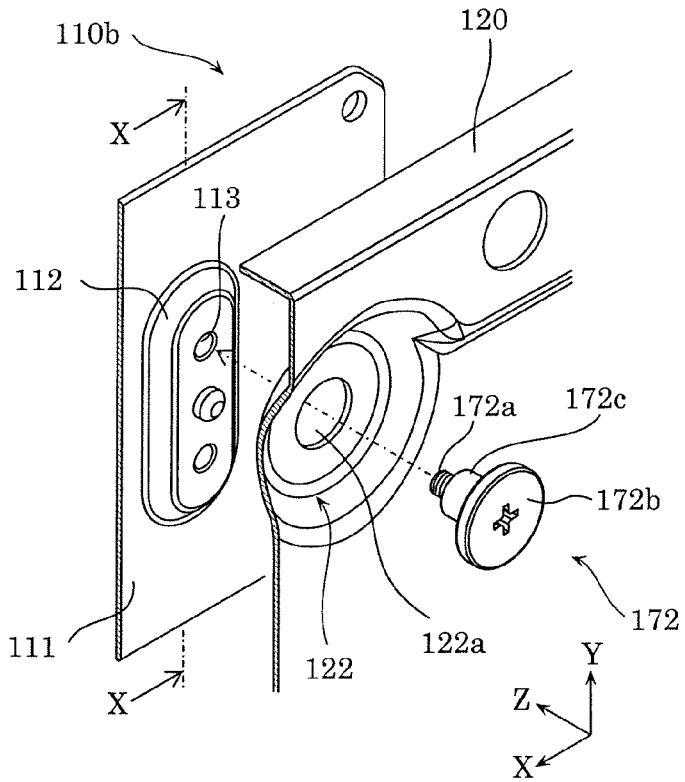
FIG. 9 is an enlarged perspective view separately showing a second attaching member and a second opening part according to Embodiment 1.

FIG. 9 is an enlarged perspective view separately showing second attaching member 110b and second opening part 122 according to Embodiment 1. Note that FIG. 9 illustrates a state in which second attaching member 110b and base plate 120 are sectioned by a Y-Z plane passing line IX-IX in FIG. 6.

Figure 10:
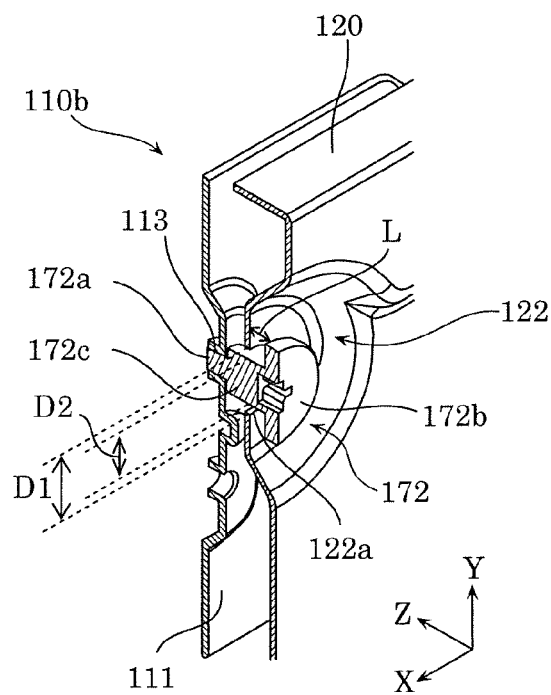
FIG. 10 is an enlarged perspective view showing a state in which a second screw that has passed through the second opening part according to Embodiment 1 is fixed to the second attaching member.

FIG. 10 is an enlarged perspective view showing a state in which second screw 172 that has passed through second opening part 122 according to Embodiment 1 is fixed to second attaching member 110b. Note that FIG. 10 illustrates a state in which second attaching member 110b and base plate 120 are sectioned by a Y-Z plane passing line X-X in FIG. 9.

As shown in FIGS. 7 and 8, first attaching member 110a is arranged at a position opposed to first opening part 121 included in base plate 120, and is fastened with first opening part 121 by first screw 171 passing through first opening part 121.

Specifically, first opening part 121 is a portion in which opening 121a through which first screw 171 passes is formed, in base plate 120. In the present embodiment, a hole into which convex part 114 of first attaching member 110a is inserted is formed below opening 121a, and first opening part 121 and first attaching member 110a are positioned one to another by convex part 114 being inserted into the concerned hole.

First attaching member 110a is fixed to base plate 120 by being fastened to first opening part 121 with first screw 171 and, as a result of that, comes into a state of normally receiving load of display unit 100 (including a case in which the load is at least a part of the whole load). In other words, first attaching member 110a, in normal time, has a role as a member for supporting display unit 100. In contrast to this, second attaching member 110b, in normal time, does not have the role of supporting display unit 100.

Specifically, as shown in FIGS. 9 and 10, second attaching member 10b is arranged at a position opposed to second opening part 122 included in base plate 120, and second screw 172 which passes through second opening part 122 is screwed into screw hole 113 of second attaching member 110b.

Second opening part 122 is a portion where opening 122a through which second screw 172 passes is formed in base plate 120. A size of opening 122a is larger than a size of step part 172c which is a portion to be arranged within opening 122a, in second screw 172. That is, in a state in which shaft part 172a of second screw 172 is screwed into screw hole 113 of second attaching member 110b (second screw 172 is fixed to second attaching member 110b), there is a gap between step part 172c of second screw 172 and the inner periphery of opening 122a. Note that step part 172c is an example of a protruding part provided in the second attaching member.

To be more specific, opening 122a and step part 172c both have a circular shape as viewed from the axial direction of second screw 172 (Z-axis direction in the present embodiment). Moreover, letting an inner diameter of opening 122a be D1, and an outer diameter of step part 172c be D2, D1>D2. Further, there is a gap of a width L (L>0) between head part 172b of second screw 172 and a surface where opening 122a is formed.

That is, base plate 120, in which second screw 172 merely passes through second opening part 122, has no substantial mechanical engagement with second screw 172. Therefore, second attaching member 110b is, in normal time, in a state of not receiving load of display unit 100. In other words, second attaching member 110b, in normal time, does not have a role as a member for supporting display unit 100. However, for example, when first attaching member 110a is peeled off from display unit 100, second attaching member 110b functions as a member for supporting display unit 100. Moreover, there is a gap (also called as an "allowance") between opening 122a of second opening part 122 and second screw 172. This can even make display unit 100 move or change in a posture when second attaching member 110b comes into a state of supporting display unit 100. This allows a user to recognize that a structural abnormality has occurred in image display device 10.

Note that in the present embodiment, although both of first opening part 121 and second opening part 122 have a concave shape recessed to display unit 100 side as shown in FIGS. 7 to 10, there is no particular limitation on a peripheral shape of each of opening 121a and opening 122a. For example, opening 121a or opening 122a may be formed in a planar portion in base plate 120 so that the concerned portion is treated as first opening part 121 or second opening part 122. Moreover, for example, a part of base plate 120 may be cut and raised to form opening 121a or opening 122a in the cut and raised portion so that the concerned portion is treated as first opening part 121 or second opening part 122.

Moreover, all of ten attaching members 110 other than two attaching members 110 which are treated as second attaching member 110b, of twelve attaching members 110 shown in FIG. 6, do not need to be connected to base plate 120 in the same mode as that shown in FIGS. 7 and 8. For example, seven attaching members 110 located further downward than center line C may be connected to base plate 120 via other members (for example, light-source support member 155) fixed to base plate 120. In this case, each of 7 attaching members 110 is fastened with the concerned other members in a direct manner with first screw 171. However, as a result of that the concerned other members are fixed to base plate 120, the concerned seven attaching members 110, in normal time, functions as a member for supporting display unit 100.

[1-3. Effects and the Like]

As described so far, image display device 10 according to the present embodiment includes: display unit 100 having display panel 102 for displaying an image on a front surface of display panel 102, and support plate 101 opposing a back surface of display panel 102 and for supporting display panel 102; a plurality of attaching members 110 arranged on support plate 101; and base plate 120 opposing a back surface of support plate 101. Base plate 120 has first opening part 121 and second opening part 122. First opening part 121 has opening 121a, through which first screw 171 passes, first screw 171 fastening base plate 120 with first attaching member 110a which is one of the plurality of attaching members 110. Second opening part 122 has opening 122a, into which a protruding part (step part 172c of second screw 172) is inserted, the protruding part being provided on second attaching member 110b, which is one of the plurality of attaching members 110, opening 122a being larger than step part 172c as viewed from the protruding direction (axial direction of second screw 172) of step part 172c.

According to this configuration, since display panel 102 is supported from the back side, there is no need of a frame member for supporting display panel 102 from the outer periphery in a front view. Therefore, at least, thickness reduction of the peripheral edge part of a portion to display an image in image display device 10 is achieved.

Further, since second attaching member 110b is, in normal time, in the state of not receiving load of display unit 100, strength deterioration of a bonded portion with back surface 101a of support plate 101 is not likely to occur. For that reason, upon occurrence of an abnormality that one or more of first attaching members 110a come off from support plate 101, if second attaching member 110b comes into the state of receiving load of display unit 100, it can play the role as the member for supporting display unit 100.

To be specific, when second attaching member 110b comes into the state of receiving load of display unit 100, second screw 172 fixed to second attaching member 110b moves, for example, downward with respect to second opening part 122, and second screw 172 comes into a state of being hooked to opening 122a. That is, presence of an allowance between the peripheral edge of second screw 172 and opening 122a causes movement or change in the posture of display unit 100 occurs, thereby allowing a user to recognize that a structural abnormality has occurred in image display device 10. As a result, the user can take an action such as demanding repair to a manufacturer of image display device 10 before complete falling off (mechanical disconnection with stand 200) of display unit 100 occurs.

In this way, image display device 10 according to the present embodiment is image display device 10 that enables thickness reduction and has an advantageous structure.

Note that in the present embodiment, as shown in FIG. 10, there is a gap of a width L (L>0) between head part 172b of second screw 172 and a surface where opening 122a is formed. That is, there is also a gap (allowance) in an axial direction of second screw 172 between second screw 172 and opening 122a. Therefore, for example, an effect of preventing coming off from opening 122a of second screw 172 by head part 172*b* of second screw 172 can be achieved and it is possible to make display unit 100 inclined in the front-back direction upon occurrence of an abnormality. That is, possibility that a user recognizes occurrence of a structural abnormality is enhanced.

Here, for example, it is also conceivable to increase the number of fastening sites between base plate 120 and display unit 100 by making all of twelve attaching members 110 shown in FIG. 6 be first attaching members 110*a*, thereby decreasing possibility that display unit 100 falls off. However, even if the number of first attaching members 110*a* is increased, the fact remains that each first attaching member 110*a*, in normal time, continues to receive load of display unit 100. Therefore, each of first attaching members 110*a* may be possibly peeled off from display unit 100 due to, for example, degradation of a bonded portion. That is, it is hard to say that increasing the number of first attaching members 110*a* is sufficient fundamental solution to prevent falling off of display unit 100. In that point, in image display device 10 according to the present embodiment, arranging at least one combination of second attaching member 110*b*, second screw 172, and second opening part 122 will cause these elements to function as a fail-safe mechanism relating to supporting of display unit 100. That is, certainty to prevent falling off of display unit 100 in image display device 10 is increased.

Moreover, in the present embodiment, a support member for supporting display panel 102 is support plate 101 opposing a back surface of display panel 102, and a plurality of attaching members 110 are bonded to the back surface of support plate 101.

According to this configuration, display unit 100 is supported by first attaching member 110*a* bonded to back surface 101*a* of support plate 101. That is, there is no need of a screw hole for fixing first attaching member 110*a* in support plate 101 that forms the backmost in display unit 100. For that reason, for example, a member in which it is substantially impossible to form a screw hole, such as a glass plate can be adopted as support plate 101. For example, when a glass plate is adopted as support plate 101 to improve aesthetic appearance of image display device 10, it is possible to fix a plurality of attaching members 110 to the support plate without performing processing such as forming screw holes in support plate 101. That is, adopting a glass plate as support plate 101 makes it possible to support display panel 102 from the back side even when an exposed portion of display unit 100 on the back side of image display device 10 is made to have glossy feeling peculiar to glass. As a result of this, thickness reduction of the peripheral edge part of a portion for displaying an image in image display device 10 is achieved.

Further, in the present embodiment, second attaching member 110*b* is arranged further upward than the middle (center line C) in the up-down direction in display unit 100 as shown in FIG. 6. To be more specific, second attaching member 110*b* is arranged such that step part 172*c* of second screw 172 is located not lower than the middle (center line C) in the up-down direction in display unit 100.

As a result of this, even if all of first attaching members 110*a* are peeled off from display unit 100, display unit 100 is supported by second screw 172, which is hooked to opening 122*a* of second opening part 122, at a position not lower than the middle in the up-down direction. For that reason, safety or stability in a state in which display unit 100 is supported by second screw 172 is improved.

Further, in the present embodiment, as shown in, for example, FIG. 6, two second attaching members 110*b* are arranged side by side in the left-right direction in back surface 101*a* of support plate 101.

According to this configuration, it is possible to inhibit display unit 100 from rotating around an axis in the front-back direction (Z-axis). Further, even if display unit 100 is brought into a forwardly inclined posture, display unit 100 is suppressed from rotating around an axis in the up-down direction (Y-axis).

Suppressing display unit 100 from rotating around the Z-axis or Y-axis in this way will reduce possibility that a corner part, which is easy to be damaged in rectangular display unit 100, interferes with another member present in the vicinity of display unit 100. That is, even when displacement occurs in display unit 100 as a result of one or more of first attaching members 110*a* being peeled off from display unit 100, damage of display panel 102 or support plate 101 made of glass, etc., will be avoided. As a result, possibility that repair of image display device 10 becomes difficult will be reduced.

Note that in the present embodiment, two second attaching members 110*b* are arranged at a position where the middle of a line segment connecting two second attaching members 110*b* overlaps with the middle in the left-right direction (X-axis direction) of display unit 100. Therefore, for example, when display unit 100 is supported only at positions of two second attaching members 110*b*, load to be applied to two second attaching members 110*b* is equalized. That is, since possibility that an excess load is applied to one second attaching member 110*b* is reduced, stability or safety of supporting display unit 100 by two second attaching members 110*b* is improved.

Further, in the present embodiment, for example as shown in FIGS. 3 and 4, image display device 10 includes: light guide plate 103 arranged between display panel 102 and support plate 101; LED unit 150 arranged at a position opposed to the lower end surface of light guide plate 103; and light-source support member 155 that supports LED unit 150 from below, in display unit 100.

In this way, in image display device 10 according to the present embodiment, light-source support member 155 is arranged for supporting LED unit 150, which enters light to the lower end surface of light guide plate 103, from below. That is, structurally, light-source support member 155 is present further downward than the lower and part of display unit 100. Therefore, when display unit 100 moves downward, it is possible to make light-source support member 155 function as a member for supporting display unit 100 from below. Moreover, when metal is adopted as a material for light-source support member 155, for example, to improve heat radiation capability by light-source support member 155, light-source support member 155 has relatively high rigidity or strength. Therefore, effectiveness of the function of light-source support member 155 to support display unit 100 is also improved.

Moreover, in the present embodiment, as shown in, for example, FIGS. 2A, 3, and 4, image display device 10 includes bezel 140 which covers the lower end part of the front surface of display panel 102.

That is, there is bezel 140 in front of the lower end part of display unit 100. Therefore, if one or more of first attaching members 110*a* are peeled off from display unit 100, it is possible to make bezel 140 function as a member for supporting display unit 100 from forward. For example, when display unit 100 moves downward, it is possible to bring display unit 100 into a forwardly inclined posture caused by the lower end part of display unit 100 being hooked to bezel 140. That is, it becomes possible to allow a user to more easily recognize occurrence of a structural abnormality in image display device 10 while suppressing excessive movement of display unit 100.

Moreover, in a front view, display unit 100 is covered with bezel 140 only in the lower end part. Therefore, by concentrating components such as above described LED unit 150 in a lower part of display unit 100, it is possible to hide these components with bezel 140.

Moreover, in the present embodiment, as shown in, for example, FIGS. 2A, 3, and 4, screw hole 113, which is screwed with first screw 171 which is a fastening member, is formed in first attaching member 110a. Second attaching member 110b has screw hole 113, into which second screw 172 forming a protruding part is screwed, and which has the same inner diameter as that of screw hole 113 of first attaching member 110a.

That is, screw hole 113 of the same size and shape is formed in each of first attaching member 110a and second attaching member 110b. Therefore, for example, first attaching member 110a and second attaching member 110b can be made common. Specifically, in the present embodiment, attaching member 110 shown in FIG. 5 is used as first attaching member 110a and second attaching member 110b. That is, there is no need of separately fabricating first attaching member 110a for fixing display unit 100 to base plate 120, and second attaching member 110b as engaging means when first attaching member 110a is peeled off. This is advantageous in a viewpoint of improving manufacturing efficiency or reducing manufacturing cost of image display device 10.

Moreover, in the present embodiment, the protruding part provided in second attaching member 110b is step part 172c in a stepped screw (second screw 172) which has shaft part 172a to be screwed into screw hole 113 formed in second attaching member 110b, and step part 172c formed at the foot of shaft part 172a. That is, opening 122a formed in second opening part 122 is formed into a size larger than that of step part 172c as viewed from an axial part direction of shaft part 172, and is inserted with step part 172c.

According to this configuration, even when second screw 172 has been firmly screwed into screw hole 113, a gap is formed between opening 122a and step part 172c, and a gap is also formed between head part 172b and the peripheral edge of opening 122a. This ensures and facilitates provision of second screw 172, which functions as a fail-safe mechanism for supporting display unit 100, to second attaching member 110b. This, for example, contributes to improvement of manufacturing efficiency of image display device 10 having an advantageous structure.

Other Embodiments Relating to Embodiment 1

So far, Embodiment 1 has been described as exemplification of technology disclosed in the present application. However, technology in the present disclosure can be applied, without being limited to this, to other embodiments in which appropriate modification, replacement, addition, omission, and the like have been made. Moreover, it is possible to obtain a new embodiment by combining each component described in Embodiment 1. Accordingly, hereinafter, other embodiments are exemplified.

For example, the shape and the size of opening 122a of second opening part 122 are not limited to the shape and size shown in FIGS. 9 and 10. For example, opening 122a needs not to have a circular shape, and may be a shape elongated in a predetermined direction.

Figure 11:
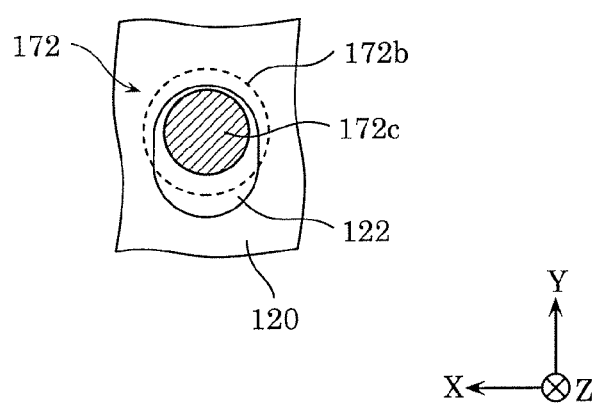
FIG. 11 is a diagram showing an example of an opening of another shape formed in the second opening part.

FIG. 11 is a diagram showing an example of opening of another shape formed in second opening part 122. Note that in FIG. 11, to make the structural relation between opening 122b formed in second opening part 122 and second screw 172 clear, head part 172b of second screw 172 is represented by a circle of dotted line, and step part 172c located within opening 122b is represented by a circular shape with hatching lines.

Opening 122b formed in second opening part 122 shown in FIG. 11 is longer in the up-down direction than in the left-right direction. That is, opening 122b has a vertically long shape. Moreover, in normal time, at least in a lower part of step part 172c, a gap exists between step part 172c and the inner periphery of opening 122b.

In this case, if display unit 100 is about to move caused by one or more of first attaching members 110a being peeled off from display unit 100, the moving direction of display unit 100 is restricted to a directly downward direction (Y-axis minus direction) by second screw 172 being guided by opening 122b. In this way, it is possible to control the moving direction of display unit 100 according to a shape of opening 122b.

For that reason, for example, upon occurrence of an abnormality that one or more of first attaching members 110a are peeled off from display unit 100, it is possible to move display unit 100 in a mode easily recognizable by a user and in a safe manner.

Moreover, although in the present embodiment, second screw 172 has head part 172b which is larger than opening 122a formed in second opening part 122, this is not essential. For example, even when head part 172b is smaller than opening 122a, since the moving direction of display unit 100 is mainly downward, there is high possibility that head part 172b is hooked to the lower end of opening 122a. Moreover, even when second screw 172 does not have head part 172b, if a length in the axial direction of step part 172c is relatively long, there is low possibility that step part 172c comes off from opening 122a when display unit 100 has moved.

Moreover, it is not essential that second screw 172 has step part 172c, and for example, a bar having the same diameter as that of shaft part 172a of second screw 172 may be arranged at a position of step part 172c.

Moreover, a protruding part provided in second attaching member 110b may be implemented by other than second screw 172. For example, a convex part having a size which can be inserted into opening 122a of second opening part 122 is formed in second attaching member 110b, and a screw having a head part which is larger than opening 122a is attached to a tip end of the convex part in a state of passing through opening 122a. As a result of this, it is possible to make the convex part integrally provided in second attaching member 110b bear a function similar to that of second screw 172.

Moreover, a planar convex part may be formed by cutting and raising a part of second attaching member 110b which is a planar member. In this case, by bending a tip end of metal piece, which has been cut and raised, downward thereby preventing the protruding part from coming off from opening 122a of second opening part 122.

Moreover, out of twelve attaching members 110 show in FIG. 6, the number of second attaching members 110b is not limited to two, and at least one second attaching member 110b may be bonded to support plate 101. Moreover, for example, one or more of second attaching members 110b may be bonded to a region further downward than center line C in back surface 101a of support plate 101.

Moreover, the number of attaching members 110 to be bonded to back surface 101a of support plate 101 will not be limited to twelve. The number of attaching members 110 included in image display device 10 and how many thereof shall be arranged as first attaching member 110a, may be appropriately determined taking into consideration of, for example, the weight of display unit 100, life of other components such as display panel 102, etc., and durability of adhesive to be used for bonding of attaching member 110. Moreover, arrangement positions of one or more of first attaching members 110a and one or more of second attaching members 110b may be appropriately determined taking into consideration of, for example, center of gravity of display unit 100, or the size and shape, etc., of base plate 120.

Moreover, in the above described embodiment, although first attaching member 110a and second attaching member 110b are supposed to be a common member, first attaching member 110a and second attaching member 110b may each have a shape and size different from each other. For example, second attaching member 110b which has a role as the engaging means for emergency may have screw hole 113 with an inner diameter larger than screw hole 113 of first attaching member 110a such that a screw with a larger diameter can be fixed. Moreover, each of first attaching member 110a and second attaching member 110b may each have a plurality of screw holes 113 so that a plurality of screws may be provided.

Further, a type of display panel 102 included in image display device 10 will not be limited to a liquid crystal cell, and for example, an organic electroluminescence (EL) display panel may be adopted as display panel 102. In this case, display unit 100 is constituted by, for example, the organic EL display panel and support plate 101 attached to the back surface of the organic EL display panel.

Embodiment 2

Figure 12A:
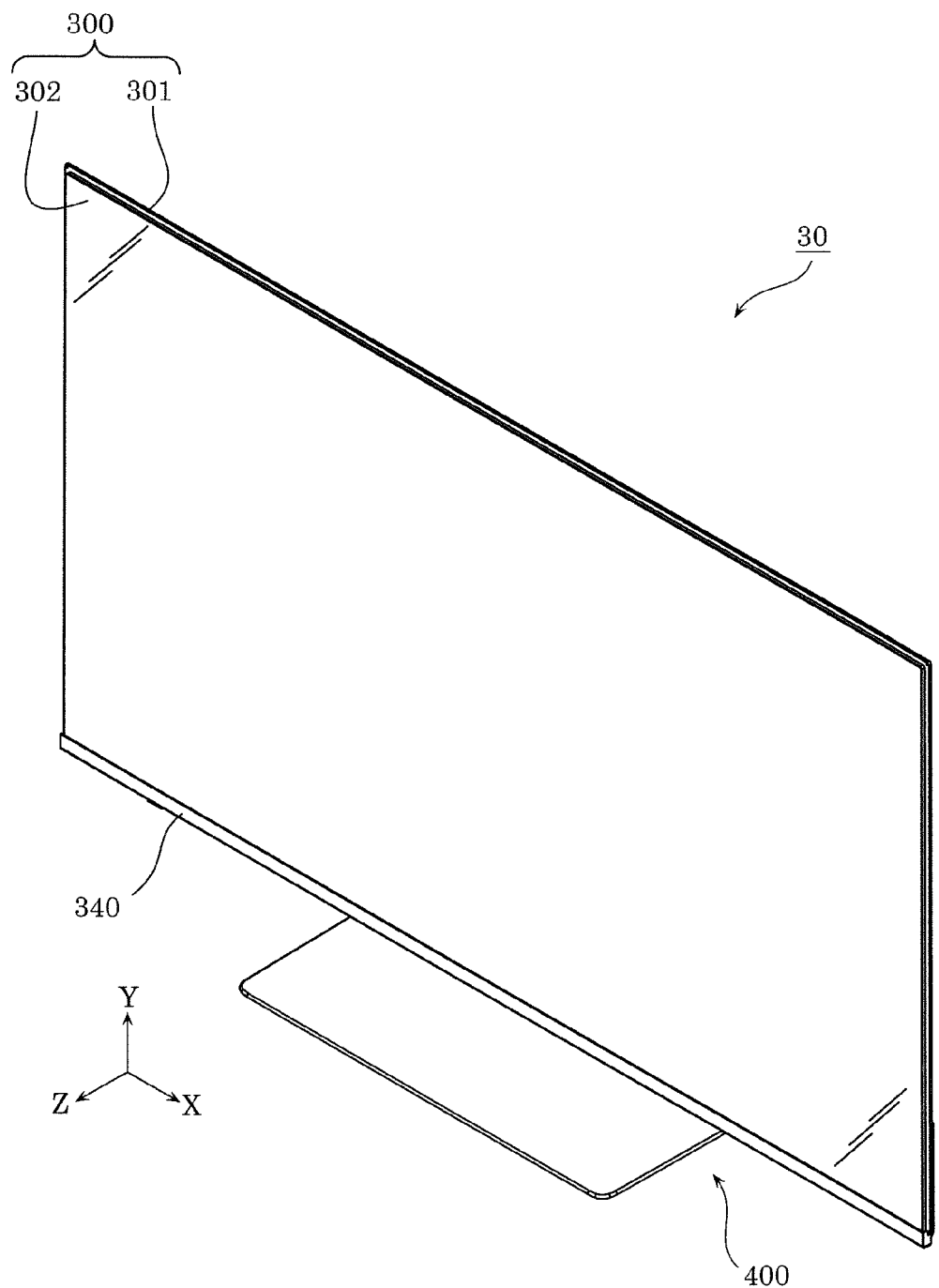
FIG. 12A is a perspective view showing a front side of an image display device according to Embodiment 2.
Figure 12B:
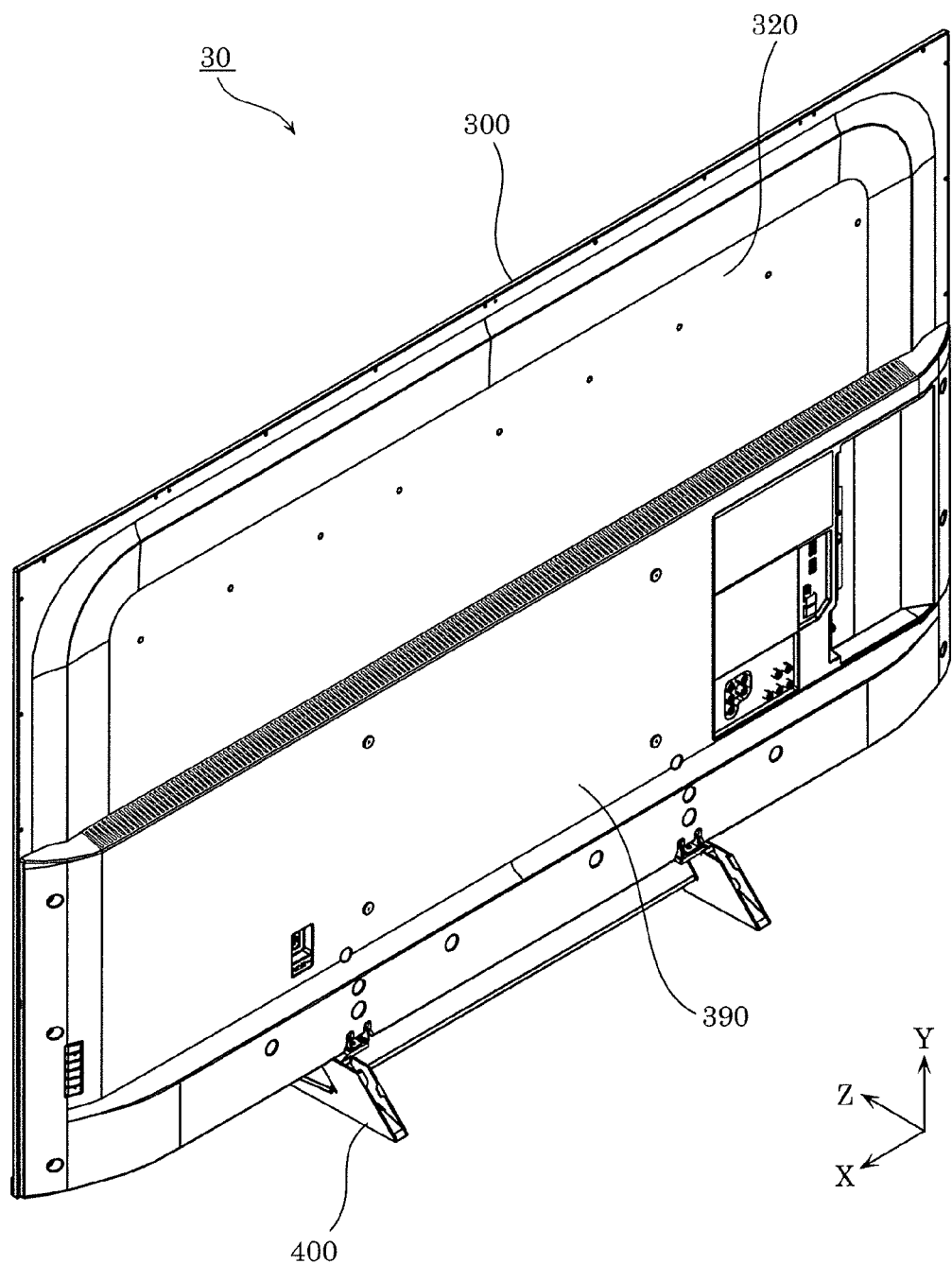
FIG. 12B is a perspective view showing a back side of the image display device according to Embodiment 2.
Figure 13:
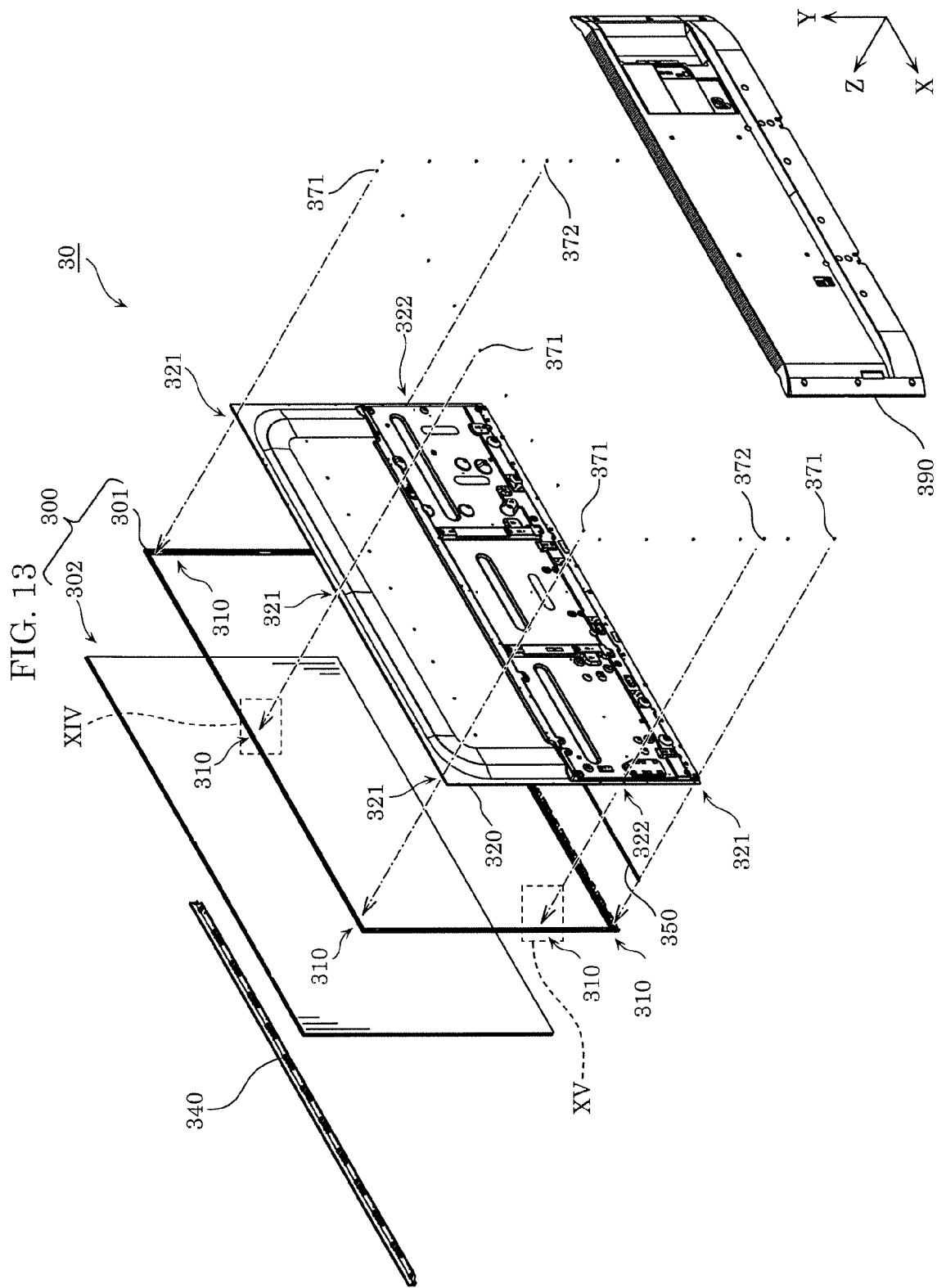
FIG. 13 is an exploded perspective view of the image display device according to Embodiment 2.

Next, Embodiment 2 will be described with reference to FIGS. 12A to 17. First, referring to FIGS. 12A to 13, a configuration outline of an image display device according to Embodiment 2 will be described.
[2-1. General Configuration of Image Display Device]
FIG. 12A is a perspective view showing a front side of image display device 30 according to Embodiment 2. FIG. 12B is a perspective view showing a back side of image display device 30 according to Embodiment 2. FIG. 13 is an exploded perspective view of image display device 30 according to Embodiment 2. Note that in FIG. 13, illustration of various kinds of electronic circuits, wiring, and stand 400, etc., are omitted.

As shown in FIGS. 12A and 12B, image display device 30 is, for example, a liquid crystal television receiver of a flat panel display type. Image display device 30 includes display unit 300 and stand 400 that supports display unit 300. Display unit 300 includes display panel 302 for displaying an image on a front surface (surface of Z-axis plus side) of display panel 302, and frame member 301 attached to the peripheral edge of a back surface of display panel 302. Frame member 301 is an example of the support member. Base plate 320 opposes a back surface of frame member 301. Back cover 390 which is, for example, a resin molded product opposes a back surface of base plate 320, and back cover 390 covers only a part of a back surface of base plate 320 so that other portions are exposed. Note that although back cover 390 is constituted by a plurality of members such as a main body and a lid plate, the plurality of members are regarded as back cover 390 in the present embodiment.

In the present embodiment, display panel 302 included in display unit 300 is a liquid crystal cell, and display unit 300 further includes an optical member such as an optical sheet unit and a light guide plate. Moreover, LED unit 350, which is an example of a light source part, is arranged at a position opposed to a lower end surface of the light guide plate. In the present embodiment as with Embodiment 1, light for image display is supplied to display panel 302, which is the liquid crystal cell, by an edge-light type backlight. Details of display unit 300 will be described below with reference to FIGS. 16 and 17.

LED unit 350, as with LED unit 150 according to Embodiment 1, includes a long-size substrate lying along the lower end surface of light guide plate 303, and a plurality of LED elements arranged in line on an upper surface of the substrate.

Moreover, in the present embodiment, bezel 340 that covers the lower end part of the front surface of display panel 302 and LED unit 350 is included in image display device 30 as shown in FIGS. 12A and 13. Bezel 340 is fixed in image display device 30 by being directly or indirectly connected with base plate 320.

Stand 400 is a leg part for making image display device 30 stand by itself, and is mechanically connected with base plate 320. Note that image display device 30 may include, in place of stand 400, for example, a wall-hanging unit for installing image display device 30 on the wall surface.

Frame member 301 that supports display panel 302 is, for example, a member made of resin, and is arranged along four sides (upper side, left side, right side, and lower side) on the back surface of display panel 302, in the present embodiment. Note that frame member 301 may be a rectangular-annular member in which portions corresponding to the above described four sides are integrally formed. Moreover, rectangular-annular frame member 301 may be formed by two or more members being connected by a screw, etc.

Frame member 301 is specifically attached to base plate 320 by a plurality of screws. More specifically, as shown in FIG. 13, base plate 320 includes a plurality of first opening parts 321 arranged along the peripheral edge, and second opening parts 322 which are arranged one each in the left and the right. Attaching member 310 is arranged at each of positions opposed to first opening part 321 and second opening part 322 in frame member 301. First screw 371 is inserted into first opening part 321 of base plate 320, and first screw 371 is screwed with attaching member 310 located at an opposed position. Second screw 372 is inserted into second opening part 322 of base plate 320, and second screw 372 is screwed with attaching member 310 located at an opposed position. As a result of this, frame member 301 that supports display panel 302 is fixed to base plate 320.

Note that in FIG. 13, although only four of a plurality of first screws 371 are given symbol 371 for the sake of simplicity, all of the screws other than two second screws 372, which are located at the same position as four first screws 371 in the Z-axis direction, are first screws 371. Moreover, first opening part 321 and attaching member 310 are arranged at a position opposed to each of all first screws 371 in the Z-axis direction.

Here, attaching member 310 opposed to second opening part 322 out of a plurality of attaching members 310 plays a different role than attaching member 310 opposed to first opening part 321. Hereinafter, configurations of attaching member 310 and its surroundings in image display device 30 according to the present embodiment will be described with reference to FIGS. 14 to 17.

[2-2. Configurations of Attaching Member and its Surroundings]

Figure 14:
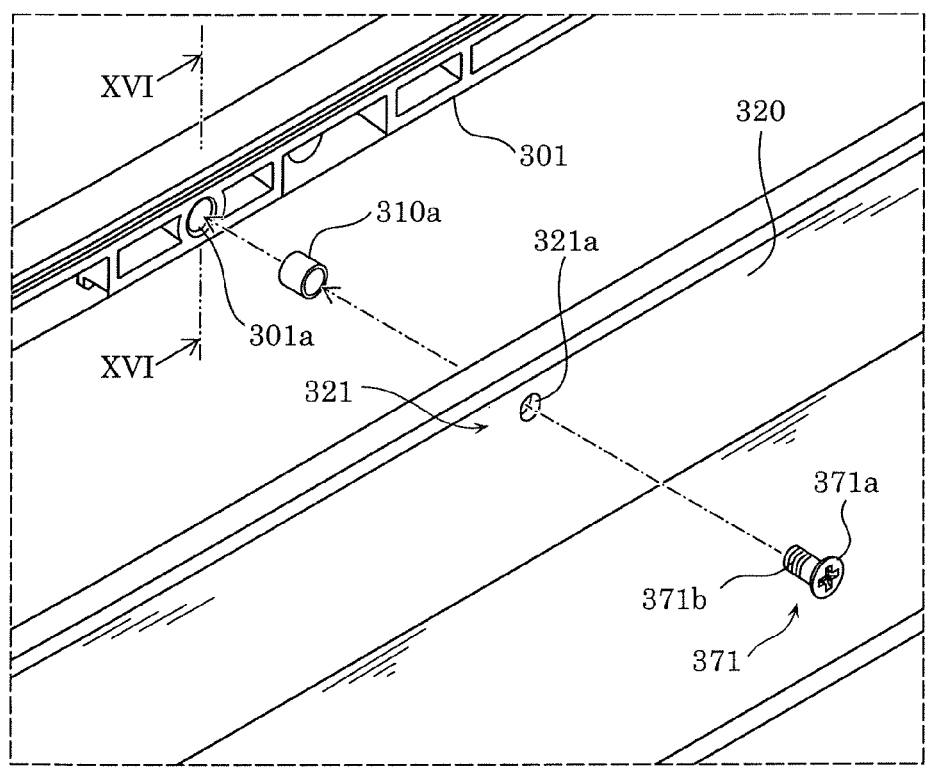
FIG. 14 is an exploded perspective view showing configurations of a first attaching member and its surroundings according to Embodiment 2.
Figure 15:
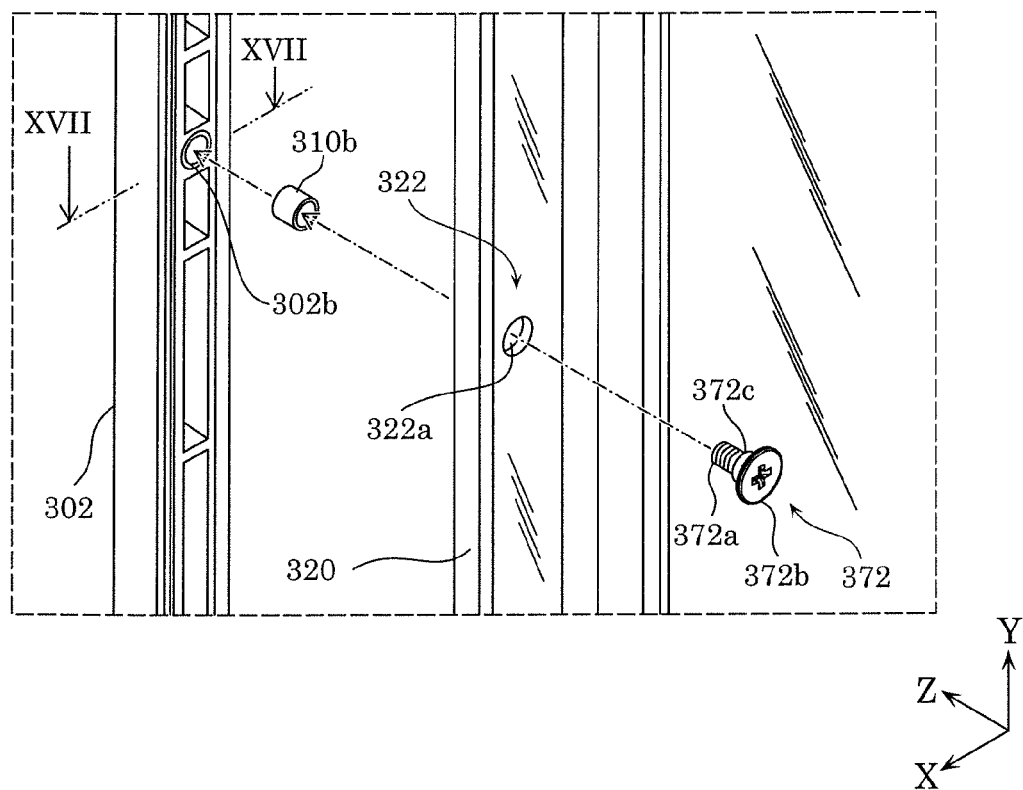
FIG. 15 is an exploded perspective view showing configurations of a second attaching member and its surroundings according to Embodiment 2.

FIG. 14 is an exploded perspective view showing configurations of first attaching member 310a and its surroundings according to Embodiment 2. Specifically, FIG. 14 shows configurations of attaching member 310, which is arranged in a dotted-line rectangular shape XIV in FIG. 13, and its surroundings. FIG. 15 is an exploded perspective view showing configurations of second attaching member 310b and its surroundings according to Embodiment 2. Specifically, FIG. 15 shows configurations of attaching member 310, which is arranged in a dotted-line rectangular shape XV in FIG. 13, and its surroundings. Note that in FIGS. 14 and 15, illustration of components (display panel 302 or the like) other than frame member 301 in display unit 300 is omitted.

Figure 16:
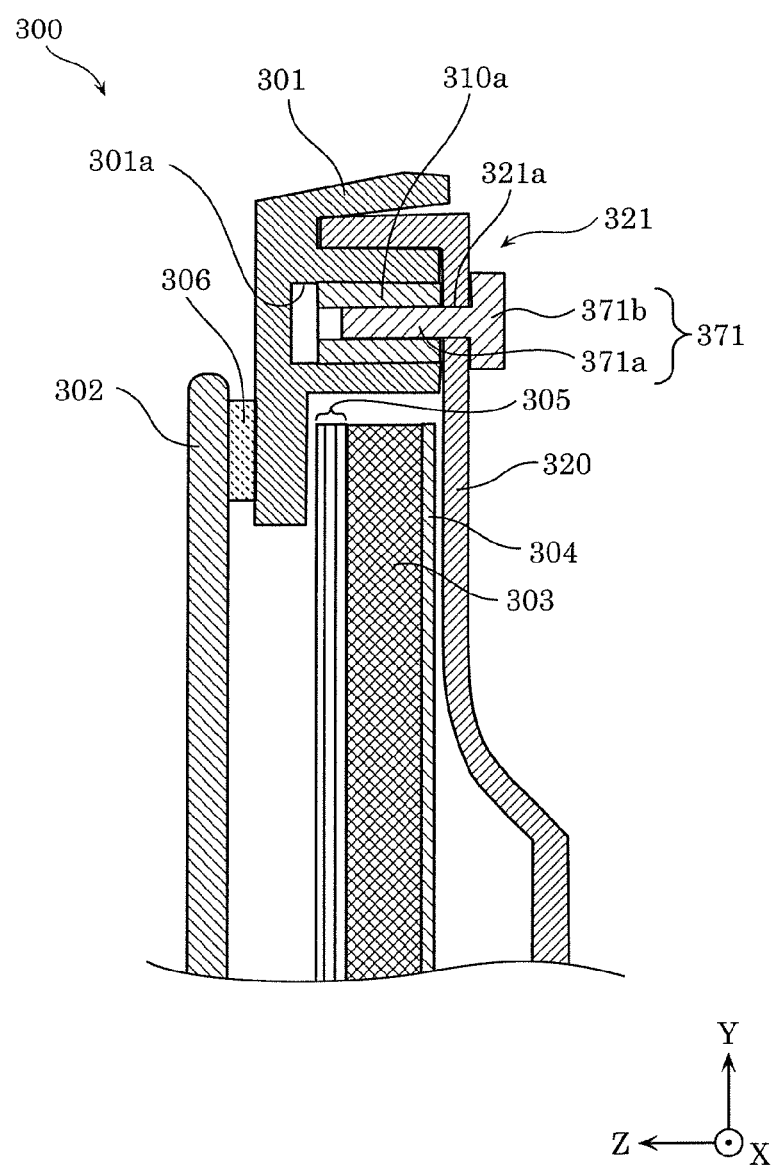
FIG. 16 is a partial sectional view showing configurations of a first attaching member and its surroundings according to Embodiment 2.
Figure 17:
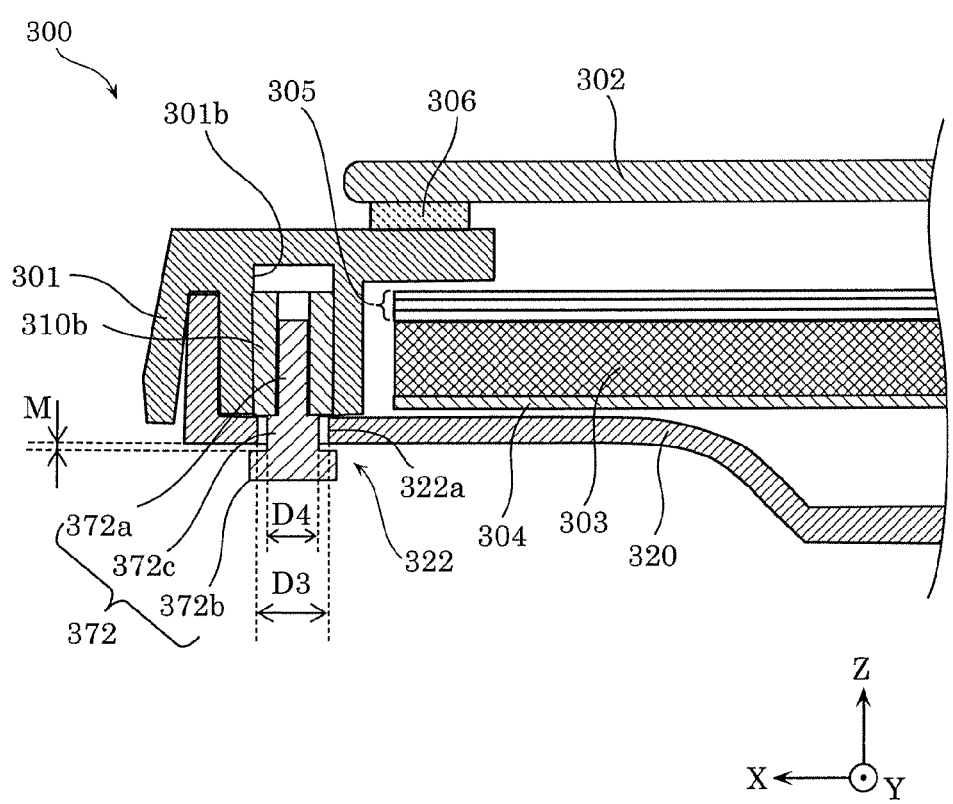
FIG. 17 is a partial sectional view showing configurations of a second attaching member and its surroundings according to Embodiment 2.

FIG. 16 is a partial sectional view showing configurations of first attaching member 310a and its surroundings according to Embodiment 2. Specifically, FIG. 16 is a diagram schematically showing a partial cross-section of image display device 30 taken in line XVI-XVI of FIG. 14. FIG. 17 is a partial sectional view showing configurations of second attaching member 310b and its surroundings according to Embodiment 2. Specifically, FIG. 17 is a diagram schematically showing a partial cross-section of image display device 30 taken in line XVII-XVII of FIG. 15.

As shown in FIGS. 14 to 17, a plurality of attaching members 310 arranged in frame member 301 each include first attaching member 310a and second attaching member 310b. First attaching member 310a and second attaching member 310b are, for example, nuts made of metal, and first attaching member 310a is screwed with first screw 371 and second attaching member 310b is screwed with second screw 372. Frame member 301 is provided with arrangement hole 301a for arranging first attaching member 310a, and arrangement hole 301b for arranging second attaching member 310b.

When image display device 30 is assembled in such a configuration, for example, first attaching member 310a is inserted into arrangement hole 301a while being heated and pressurized. This causes an inner peripheral surface of arrangement hole 301a to be melted so that the concerned inner peripheral surface and an outer peripheral surface of first attaching member 310a are welded together. In a similar manner, second attaching member 310b is inserted into arrangement hole 301b while being heated and pressurized. This causes an inner peripheral surface of arrangement hole 301b to be melted so that the concerned inner peripheral surface and an outer peripheral surface of second attaching member 310b are welded together. That is, in the present embodiment, first attaching member 310a and second attaching member 310b are each, for example, a part so called an outsert nut, which is retro-fit to frame member 301 made of resin. For example, unevenness by knurling is formed in the outer peripheral surface of each of first attaching member 310a and second attaching member 310b such that they firmly secure to the inner peripheral surface of arrangement holes 301a and 301b.

Note that there is no particular limitation to a method of providing attaching member 310 to frame member 301, and for example, frame member 301 including attaching member 310 may be fabricated by insert molding. Besides, attaching member 310 may be fixed to frame member 301 by attaching member 310 being press fit into the arrangement hole of frame member 301. Further, attaching member 310 may be fixed to frame member 301 by an adhesive. Further, attaching member 310 may be fixed to frame member 301 by attaching member 310, which has a screw thread in the outer peripheral surface, being screwed into a screw hole of frame member 301.

First screw 371, which is a screw for fastening base plate 320 with first attaching member 310a, includes head part 371b and shaft part 371a. Second screw 372 is a screw which passes through base plate 320 and which does not fasten base plate 320 with second attaching member 310b. Second screw 372 includes head part 372b, shaft part 372a, and step part 372c provided at a foot of shaft part 372a. That is, second screw 372 is, for example, a screw called as a "stepped screw".

Specifically, as shown in FIG. 16, shaft part 371a of first screw 371 passes through opening 321a provided in first opening part 321 of base plate 320, and is screwed with first attaching member 310a. First opening part 321 which is a part of base plate 320 is clamped between head part 371b of first screw 371 and first attaching member 310a (frame member 301) by first screw 371 being fastened by a predetermined torque. In this way, first screw 371 that fastens base plate 320 with frame member 301 is arranged in a plurality of numbers in image display device 30, and thereby frame member 301 is fixed to base plate 320.

Display panel 302 is attached to frame member 301 via bonding member 306 which is, for example, a double-sided tape as shown in FIGS. 16 and 17. Moreover, an optical member (optical sheet unit 305, light guide plate 303, and reflection plate 304) included in a backlight unit is arranged in the back side of display panel 302, and these optical members are supported by frame member 301 or base plate 320 in a portion other than positions shown in FIGS. 16 and 17.

In this way, first attaching member 310a is fixed to base plate 320 by being fastened with first opening part 321 with first screw 371, and thereby base plate 320 is fixed to frame member 301. As a result, first attaching member 310a, in normal time, comes into a state of receiving load of display unit 300 (including a case in which the load is at least a part of the whole load). In other words, first attaching member 310a, in normal time, has a role as a member for supporting display unit 300. In contrast to this, second attaching member 310b, in normal time, does not have a role of supporting display unit 300.

Specifically, as shown in FIG. 17, second attaching member 310b is arranged at a position opposed to second opening part 322 included in base plate 320. Shaft part 372a of second screw 372 is screwed with second attaching member 310b. In this state, a size of opening 322a is larger than step part 372c which is a portion to be arranged inside opening 322a in second screw 372. That is, in a state in which shaft part 372a of second screw 372 is screwed with second attaching member 310b, there is a gap (gap in a radial direction) between step part 372c of second screw 372 and an inner peripheral surface of opening 322a. Note that step part 372c is an example of a protruding part provided in the second attaching member.

To be specifically, opening 322a and step part 372c both have a circular shape as viewed from an axial direction (Z-axis direction in the present embodiment) of second screw 372. Moreover, when it is supposed that an inner diameter of opening 322a is D3, and an outer diameter of step part 372c is D4, D3>D4. Further, there is a gap having a width M (hereinafter called as "gap M") between head part 372b of second screw 372 and a surface where opening 322a is formed.

That is, in second opening part 322, base plate 320 is passed through by second screw 372, and base plate 320 has no substantial mechanical engagement with second screw 372. Therefore, second attaching member 310b is, in normal time, in a state of not receiving load of display unit 300. In other words, second attaching member 310b does not have a role as a member for supporting display unit 300 in normal time. However, for example, when first attaching member 310a comes off from frame member 301 and thereby falls off from display unit 300, second attaching member 310b functions as a member for supporting display unit 300. Moreover, there is a gap (allowance) between opening 322a of second opening part 322 and second screw 372. This can even make display unit 300 move or change in a posture when second attaching member 310b comes into the state of supporting display unit 300. This allows a user to recognize that a structural abnormality has occurred in image display device 30.

[2-3. Effects and the Like]

As described so far, image display device 30 according to the present embodiment includes: display unit 300 having display panel 302 for displaying an image on the front surface of display panel 302, and frame member 301 opposing a back surface of display panel 302 and for supporting display panel 302; a plurality of attaching members 310 arranged in frame member 301; and base plate 320 opposing a back surface of frame member 301. Base plate 320 has first opening part 321 and second opening part 322. First opening part 321 has opening 321a, through which first screw 371 passes, first screw 371 fastening base plate 320 with first attaching member 310a which is one of a plurality of attaching members 310. Second opening part 322 has opening 322a, into which a protruding part (step part 372c of second screw 372) is inserted, the protruding part being provided in second attaching member 310b which is one of the plurality of attaching members 310, opening 322a being larger than step part 372c as viewed from the protruding direction (axial direction of second screw 372) of step part 372c.

According to this configuration, since display panel 302 is supported from the back side, there is no need of a frame member for supporting display panel 302 from the outer periphery in a front view. Therefore, at least, thickness reduction of a peripheral edge part of a portion to display an image in image display device 30 is achieved.

Further, since second attaching member 310b is, in normal time, in the state of not receiving load of display unit 300, strength deterioration of the fixing portion to frame member 301 is less likely to occur. Therefore, upon occurrence of an abnormality that one or more of first attaching members 310a come off from frame member 301 by deterioration over time of frame member 301 or the like, if second attaching member 310b comes into the state of receiving load of display unit 300, it can play a role as a member for supporting display unit 300.

To be more specific, when second attaching member 310b comes into the state of receiving load of display unit 300, second screw 372 fixed to second attaching member 310b moves, for example, downward with respect to second opening part 322, and second screw 372 comes into a state of being hooked in opening 322a. That is, presence of an allowance between the peripheral edge of second screw 372 and opening 322a causes movement or change in a posture of display unit 300, and thereby allowing a user to recognize that a structural abnormality has occurred in image display device 30. As a result, the user can take an action such as demanding repair to a manufacturer of image display device 30 before complete falling off (mechanical disconnection with base plate 320) of display unit 300 occurs.

In this way, image display device 30 according to the present embodiment is image display device 30 that enables thickness reduction and has an advantageous structure.

Further, in the present embodiment, two second attaching members 310b are arranged side by side in the left-right direction in frame member 301, for example as shown in FIG. 13.

According to this configuration, for example, it is possible to inhibit display unit 300 from rotating around an axis (Z-axis) in the front-back direction. Moreover, even if display unit 300 is brought into a forwardly inclined posture, display unit 300 is suppressed from rotating around an axis (Y-axis) in the up-down direction.

Suppressing display unit 300 from rotating around the Z-axis or Y-axis in this way will reduce possibility that a corner part of display panel 302, which is easy to be damaged in rectangular display unit 300, interferes with another member present in the vicinity of display unit 300. That is, even when displacement occurs in display unit 300 by one or more of first attaching members 310a coming off from display unit 300, damage of display panel 302 is avoided. As a result, possibility that repair of image display device 30 becomes difficult will be reduced.

Note that in the present embodiment, two second attaching members 310b are arranged at a position where the middle of a line segment connecting two second attaching members 310b overlaps with the middle in the left-right direction (X-axis direction) of display unit 300. Therefore, for example, when display unit 300 is supported only at positions of two second attaching members 310b, load to be applied to two second attaching members 310b is equalized. That is, since possibility that an excess load is applied to one second attaching member 310b is reduced, stability or safety of supporting display unit 300 by two second attaching members 310b is improved.

Further, as show in, for example, FIGS. 12A and 13, in the present embodiment, image display device 30 includes bezel 340 that covers a lower end part of display panel 302.

That is, there is bezel 340 in front of the lower end part of display unit 300. Therefore, even if one or more of first attaching members 310a come off from display unit 300, it is possible to make bezel 340 function as a member for supporting display unit 300 from forward. For example, when display unit 300 moves downward, it is possible to bring display unit 300 into a forwardly inclined posture by the lower end part of display unit 300 being hooked to bezel 340. That is, it becomes possible to allow a user to more easily recognize occurrence of a structural abnormality in image display device 30 while suppressing excessive movement of display unit 300.

Further, in the present embodiment, a support member for supporting display panel 302 from the back side is frame member 301 attached to a peripheral edge of the back surface of display panel 302, and a plurality of attaching members 310 are welded to frame member 301.

In this way, adopting welding as a method of fixing attaching member 310, which is a nut made of metal, to frame member 301 made of, for example, resin can increase a mechanical joining force between frame member 301 and attaching member 310. As a result, it is possible to firmly fix attaching member 310 to frame member 301.

To be specific, in the present embodiment, attaching member 310 is an outsert nut embedded in frame member 301. Therefore, attaching member 310 can be obtained or fabricated with relative ease. Further, attaching member 310 made of resin can be fixed to frame member 301 through a relatively easy process. Further, it is possible to further increase the mechanical joining force between frame member 301 and attaching member 310 by performing knurling on the outer peripheral surface of attaching member 310.

Moreover, image display device 30 according to the present embodiment includes back cover 390 that covers a part of the back surface of base plate 320. Second opening part 322 is arranged at a position which is covered with back cover 390 in base plate 320 (see FIG. 13).

According to this configuration, since opening 322a of second opening part 322, in which a gap is formed between itself and second screw 372, is covered with back cover 390, for example, invasion of foreign objects such as dust and dirt will be suppressed. Further, since the gap between second screw 372 and opening 322a, which is provided for the sake of safety of image display device 30, is hidden by back cover 390, a user will not feel uneasy upon seeing such gap.

Moreover, in the present embodiment, a protruding part provided in second attaching member 310b is step part 372c in a stepped screw (second screw 372) having shaft part 372a which is screwed with a screw hole formed in second attaching member 310b, and step part 372c formed at the foot of shaft part 372a. That is, opening 322a formed in second opening part 322 is formed into a size larger than step part 372c as viewed from an axial direction of shaft part 372a, and step part 372c is inserted thereinto.

According to this configuration, even when second screw 372 is firmly screwed into second attaching member 310b, a gap in a radial direction is formed between the inner peripheral surface of opening 322a and step part 372c, and gap M in an axial direction is formed between head part 372b and a surface where opening 322a is formed. This ensures and facilitates provision of second screw 372 to second attaching member 310b, which functions as a fail-safe mechanism for supporting display unit 300. This will contribute to improvement of manufacturing efficiency of image display device 30 having an advantageous structure.

Other Embodiments Relating to Embodiment 2

As so far described, Embodiment 2 has been described as an exemplification of the technology to be disclosed in the present application. However, technology in the present disclosure may be applied to, without being limited to this, embodiments which have been subjected to appropriate modification, replacement, addition, or omission, etc. Moreover, it is also possible to combine each component explained in Embodiment 2 described above to create a new embodiment. Accordingly, hereinafter, other embodiments will be exemplified.

For example, shapes and sizes of second opening part 322 and opening 322a will not be limited to the shape and size shown in FIG. 15. For example, the shape of opening 322a does not need to be circular, and may be a shape elongated in a predetermined direction. For example, as with opening 122b shown in FIG. 11, opening 322a of second opening part 322 may be longer in the up-down direction than in the left-right direction.

In this case, if it is assumed that display unit 300 is about to be moved by one or more of first attaching members 310a coming off from display unit 300, the moving direction of display unit 300 is restricted to a directly downward direction (direction of Y-axis minus side) by second screw 372 being guided by opening 322a. In this way, it is possible to control the moving direction of display unit 100 according to the shape of opening 122b. For that reason, for example, upon occurrence of an abnormality that one or more of first attaching members 310a come off from display unit 300, it is possible to move display unit 300 in a mode easily recognizable by a user, and in a safe manner.

Moreover, head part 372b of second screw 372 may be smaller than opening 322a. Even in this case, since the moving direction of display unit 300 is mainly the downward direction, there is high possibility that head part 372b is hooked to the lower end of opening 322a. Further, even when second screw 372 has no head part 372b, if the length in an axial direction of step part 372c is relatively long, there is low possibility that step part 372c comes off from opening 322a when display unit 300 has moved.

Moreover, it is not essential that second screw 372 has step part 372c, and for example, a bar having the same diameter as that of shaft part 372a of second screw 372 may be arranged at a position of step part 372c.

Moreover, the protruding part provided in second attaching member 310b may be implemented by a structure other than second screw 372. For example, a convex part having a size which can be inserted into opening 322a of second opening part 322 is formed in second attaching member 310b, and a screw having a head part which is larger than opening 322a is attached to a tip end of the concerned convex part which has passed through opening 322a. As a result of this, it is possible to make the convex part integrally provided in second attaching member 310b bear a function similar to that of second screw 372.

Figure 18:
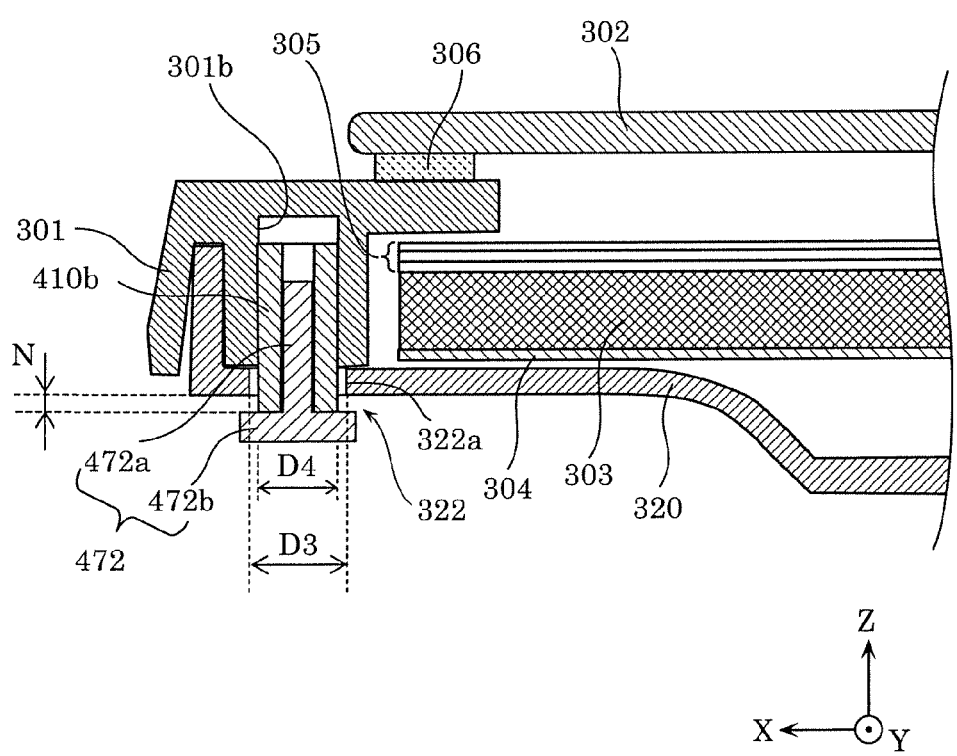
FIG. 18 is a sectional view showing a state in which a part of the second attaching member which is exposed from a frame member is inserted into an opening of a base plate.

To be specific, as shown in FIG. 18, a part of second attaching member 410b which is an outsert nut may be made exposed from frame member 301 and the exposed portion may be inserted into opening 322a.

FIG. 18 is a cross-sectional view showing a state in which a part of second attaching member 410b exposed from frame member 301 is being inserted into opening 322a. Note that the position of the cross section of FIG. 18 conforms to the position of the cross section shown in FIG. 17.

As shown in FIG. 18, second attaching member 410b which is relatively long in the axial direction is arranged in arrangement hole 301b of frame member 301 to make a part of second attaching member 410b exposed from frame member 301. Further, exposed portion (exposed part) of second attaching member 410b is inserted into opening 322a included in second opening part 322 of base plate 320, and shaft part 472a of second screw 472 having no step part is screwed with second attaching member 410b. In this case, as shown in FIG. 18, even when the whole of shaft part 472a is screwed into second attaching member 410b, head part 472b is in abutment with an end surface of the exposed part of second attaching member 410b, and not in abutment with the surface where opening 322a is formed. Moreover, outer diameter D4 of the exposed part of second attaching member 410b is smaller than inner diameter D3 of opening 322a.

Therefore, a gap in the radial direction is formed between the exposed part of second attaching member 410b and the inner peripheral surface of opening 322a, and a gap with a width N in the axial direction (gap N) is formed between head part 472b and the surface where opening 322a is formed. This ensures and facilitates provision of second screw 472, which functions as a fail-safe mechanism for the support of display unit 300, to second attaching member 310b. This, for example, contributes to improvement of manufacturing efficiency of image display device 30 having an advantageous structure.

Moreover, although in the present embodiment, it is supposed that image display device 30 has two second attaching members 310b, the number of second attaching member 310b will not be limited to two, and at least one second attaching member 310b may be fixed to frame member 301. Similarly, there is no particular limitation on the number of first attaching members 310a to be fixed to frame member 301. The numbers and arrangement positions of first attaching member 310a and second attaching member 310b may be appropriately determined according to, for example, a size or a weight of display unit 300.

For example, in the present embodiment, second attaching member 310b may be arranged further upward than the middle in the up-down direction in display unit 300. As a result of this, even if all of first attaching members 310a come off from display unit 300, display unit 300 is supported by second screw 372, which is hooked to opening 322a of second opening part 322, at a position not lower than the middle in the up-down direction. For that reason, safety or stability in a state in which display unit 300 is supported by second screw 372 is improved.

Further, a type of display panel 302 included in image display device 30 will not be limited to a liquid crystal cell, and for example, an organic EL display panel may be adopted as display panel 302. In this case, display unit 300 is constituted by, for example, the organic EL display panel, and frame member 301 attached to the back surface of the organic EL display panel.

As described above, the embodiments have been explained as examples of the technique according to the present disclosure. The accompanied drawings and the detailed description are provided for the explanation.

Therefore, in order to provide the examples of the technique, among the constituent elements illustrated in the accompanying drawings and described in the detailed description, there may be constituent elements not essential to solve the problem as well as essential constituent elements. It is therefore not reasonable to easily consider these unessential constituent elements as essential merely because the elements are illustrated in the accompanying drawings or described in the detailed description.

It should also be noted that, since the foregoing embodiments exemplify the technique according to the present disclosure, various modifications, substitutions, additions, or eliminations, for example, may be made in the embodiments within a scope of the appended claims or within a scope of equivalency of the claims.

INDUSTRIAL APPLICABILITY

The present disclosure may be applicable to an image display device for displaying images. Specifically, the present disclosure is applicable to television receivers, monitor displays, digital signage, and the like.

REFERENCE MARKS IN THE DRAWINGS 1, 10, 30 Image display device
2, 102, 302 Display panel
3 Support member
5, 100, 300 Display unit
9, 110, 310 Attaching member
9a, 110a, 310a First attaching member
9b, 110b, 310b, 410b Second attaching member
20, 120, 320 Base plate
21, 121, 321 First opening part
21a, 22a, 121a, 122a, 122b, 321a, 322a Opening
22, 122, 322 Second opening part
71 Fastening member
72 Protruding part
101 Support plate
101a Back surface
103, 303 Light guide plate
104, 304 Reflection plate
105, 305 Optical sheet unit
111 Main body part
112 Boss
113 Screw hole
114 Convex part
130 Connecting member
140, 340 Bezel
150, 350 LED unit
151 LED element
152 Substrate
155 Light-source support member
171, 371 First screw
171a, 172a, 371a, 372a, 472a Shaft part
171b, 172b, 371b, 372b, 472b Head part
172, 372, 472 Second screw
172c, 372c Step part
190, 390 Back cover
200, 400 Stand
201 Stand base
204 Neck part
301 Frame member
301a Arrangement hole
301b Arrangement hole
306 Bonding member

The invention claimed is:

1. An image display device, comprising:
a display unit including:
a display panel that displays an image on a front surface of the display panel, and
a support member opposing a back surface of the display panel and supporting the display panel;
a plurality of attaching members on the support member; and
a base plate opposing a back surface of the support member,
wherein the base plate includes:
a first opening part including an opening through which a fastening member passes, the fastening member fastening the base plate with a first attaching member that is one of the plurality of attaching members; and
a second opening part including an opening into which a protruding part is inserted, the protruding part being provided to a second attaching member that is another one of the plurality of attaching members, the opening of the second opening part being larger than the protruding part as viewed from a protruding direction of the protruding part, and
when the first attaching member supports the display unit, the inserting of the protruding part of the second attaching member into the opening larger than the protruding part as viewed from the protruding direction prevents the second attaching member from receiving load of the display unit.

2. The image display device according to claim 1, wherein the second attaching member is arranged such that the protruding part is positioned not lower than a middle of the display unit in an up-down direction.

3. The image display device according to claim 1, wherein two second attaching members each being the second attaching member are arranged side by side in a left-right direction on the back surface of the support member.

4. The image display device according to claim 1, wherein the opening in the second opening part is longer in the up-down direction than in the left-right direction.

5. The image display device according to claim 1, further comprising:
   a bezel covering a lower end part of the front surface of the display panel.

6. The image display device according to claim 1,
   wherein the first attaching member includes a first screw hole into which a first screw is screwed, the first screw being the fastening member, and
   the second attaching member includes a second screw hole into which a second screw is screwed, the second screw being the protruding part, the second screw hole having a same inner diameter as an inner diameter of the first screw hole.

7. The image display device according to claim 1,
   wherein the support member is a support plate opposing the back surface of the display panel, and
   the plurality of attaching members are bonded to a back surface of the support plate.

8. The image display device according to claim 7,
   wherein the display unit further includes:
   a light guide plate located between the display panel and the support plate;
   a light source part located at a position opposing a lower end surface of the light guide plate; and
   a light-source support member supporting the light source part from below.

9. The image display device according to claim 1,
   wherein the support member is a frame member attached to a peripheral edge of the back surface of the display panel, and
   the plurality of attaching members are press fitted into or welded to the frame member.

10. The image display device according to claim 9, wherein each of the plurality of attaching members is an outsert nut embedded in the frame member.

11. The image display device according to claim 10, wherein the protruding part is a portion of the outsert nut that is the second attaching member, the portion protruding from the frame member.

12. The image display device according to claim 9, further comprising
   a back cover covering a part of a back surface of the base plate,
   wherein the second opening part is located at a position in the base plate, the position being covered with the back cover in the base plate.

13. The image display device according to claim 1, wherein the protruding part is a step part of a stepped screw, the stepped screw including a shaft part and the step part, the shaft part being screwed into a screw hole of the second attaching member, the step part being located in a foot of the shaft part.

14. The image display device according to claim 1, wherein the opening larger than the protruding part as viewed from the protruding direction allows the protruding part to be inserted into the opening in the protruding direction.

15. An image display device, comprising:
   a display unit including:
      a display panel that displays an image on a front surface of the display panel, and
      a support member opposing a back surface of the display panel and supporting the display panel;
   a plurality of attaching members on the support member; and
   a base plate opposing a back surface of the support member,
   wherein the base plate includes:
   a first opening part including an opening through which a fastening member passes, the fastening member fastening the base plate with a first attaching member that is one of the plurality of attaching members; and
   a second opening part including an opening into which a protruding part is inserted, the protruding part being provided to a second attaching member that is another one of the plurality of attaching members, the opening of the second opening part being larger than the protruding part as viewed from a protruding direction of the protruding part to allow the protruding part to be inserted into the opening in the protruding direction.

* * * * *